US012340660B2

(12) United States Patent
Tsombanidis et al.

(10) Patent No.: US 12,340,660 B2
(45) Date of Patent: Jun. 24, 2025

(54) GAMING SYSTEMS AND METHODS USING MULTI-CYCLE AWARD SEQUENCES

(71) Applicant: LNW Gaming, Inc., Las Vegas, NV (US)

(72) Inventors: Yanis Tsombanidis, Las Vegas, NV (US); Ted Hase, Las Vegas, NV (US); Zachary Schmid, Las Vegas, NV (US); Joshua Sieverding, Henderson, NV (US); Hong Wei, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 351 days.

(21) Appl. No.: 17/960,861

(22) Filed: Oct. 6, 2022

(65) Prior Publication Data

US 2024/0119794 A1 Apr. 11, 2024

(51) Int. Cl.
*G07F 17/32* (2006.01)

(52) U.S. Cl.
CPC ...... *G07F 17/3258* (2013.01); *G07F 17/3213* (2013.01); *G07F 17/3267* (2013.01)

(58) Field of Classification Search
CPC ............. G07F 17/3258; G07F 17/3213; G07F 17/3267
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 4,733,075 | A | 3/1988 | Sato |

(Continued)

FOREIGN PATENT DOCUMENTS

| | | | |
|---|---|---|---|
| AU | 2013251288 | A1 | 5/2014 |
| AU | 2014202042 | A1 | 5/2014 |

(Continued)

OTHER PUBLICATIONS

Legato, Frank, "Aristocrat Gaming", Global Gaming Business Magazine, Sep. 27, 2021, retrieved from: https://ggbmagazine.com/article/aristocrat-gaming-2/, 14 pages.

(Continued)

*Primary Examiner* — James S. McClellan

(57) ABSTRACT

There is provided a gaming system, gaming machine, and method that utilize game-logic circuitry and a presentation assembly configured to present symbol positions and award options including award indicia, and further to present: (i) a game outcome by populating the symbol positions with symbols, and (ii) in response to the symbols including at least one trigger symbol and at least one award symbol, an award sequence comprising a cycle for each trigger symbol, each cycle of the award sequence including: selecting a respective one or more award options for each award symbol, updating award indicia for each award symbol based on the award value associated with the respective selected award options, aggregating award values indicated by the updated award indicia of the award symbols, and, in response to determining the award sequence includes one or more remaining cycles, removing the updated award indicia from the award symbols.

24 Claims, 12 Drawing Sheets

(56) References Cited

U.S. PATENT DOCUMENTS

| | | | |
|---|---|---|---|
| 5,100,137 A | 3/1992 | Fulton | |
| 5,152,529 A | 10/1992 | Okada | |
| 5,205,555 A | 4/1993 | Hamano | |
| 5,342,047 A | 8/1994 | Heidel et al. | |
| 5,356,140 A | 10/1994 | Dabrowski et al. | |
| 5,393,057 A | 2/1995 | Marnell, II | |
| 5,393,061 A | 2/1995 | Manship et al. | |
| 5,395,111 A | 3/1995 | Inoue | |
| 5,431,408 A | 7/1995 | Adams | |
| 5,511,781 A | 4/1996 | Wood et al. | |
| 5,618,232 A | 4/1997 | Martin | |
| 5,695,188 A | 12/1997 | Ishibashi | |
| 5,704,835 A | 1/1998 | Dietz | |
| 5,722,891 A | 3/1998 | Inoue | |
| 5,752,881 A | 5/1998 | Inoue | |
| 5,766,074 A | 6/1998 | Cannon et al. | |
| 5,788,573 A | 8/1998 | Baerlocher et al. | |
| 5,807,177 A | 9/1998 | Takemoto et al. | |
| 5,810,665 A | 9/1998 | Takemoto et al. | |
| 5,833,537 A | 11/1998 | Barrie | |
| 5,848,932 A | 12/1998 | Adams | |
| 5,855,515 A | 1/1999 | Pease et al. | |
| 5,876,284 A | 3/1999 | Acres et al. | |
| 5,882,259 A | 3/1999 | Holmes, Jr. et al. | |
| 5,882,261 A | 3/1999 | Adams | |
| 5,890,962 A | 4/1999 | Takemoto | |
| 5,911,418 A | 6/1999 | Adams | |
| 5,947,820 A | 9/1999 | Morro et al. | |
| 5,951,397 A | 9/1999 | Dickinson | |
| 5,988,638 A | 11/1999 | Rodesch et al. | |
| 6,027,115 A | 2/2000 | Griswold et al. | |
| 6,033,307 A | 3/2000 | Vancura | |
| 6,048,269 A | 4/2000 | Burns et al. | |
| 6,050,895 A | 4/2000 | Luciano, Jr. et al. | |
| 6,056,642 A | 5/2000 | Bennett | |
| 6,068,553 A | 5/2000 | Parker | |
| 6,089,976 A | 7/2000 | Schneider et al. | |
| 6,089,977 A | 7/2000 | Bennett | |
| 6,102,798 A | 8/2000 | Bennett | |
| 6,120,031 A | 9/2000 | Adams | |
| 6,142,873 A | 11/2000 | Weiss et al. | |
| 6,159,097 A | 12/2000 | Gura | |
| 6,162,121 A | 12/2000 | Morro et al. | |
| 6,168,520 B1 | 1/2001 | Baerlocher et al. | |
| 6,186,894 B1 | 2/2001 | Mayeroff | |
| 6,203,429 B1 | 3/2001 | Demar et al. | |
| 6,213,875 B1 | 4/2001 | Suzuki | |
| 6,224,482 B1 | 5/2001 | Bennett | |
| 6,224,483 B1 | 5/2001 | Mayeroff | |
| 6,224,484 B1 | 5/2001 | Okuda et al. | |
| 6,227,971 B1 | 5/2001 | Weiss | |
| 6,241,607 B1 | 6/2001 | Payne et al. | |
| 6,251,013 B1 | 6/2001 | Bennett | |
| 6,270,411 B1 | 8/2001 | Gura et al. | |
| 6,270,412 B1 | 8/2001 | Crawford et al. | |
| 6,290,600 B1 | 9/2001 | Glasson | |
| 6,309,300 B1 | 10/2001 | Glavich | |
| 6,319,124 B1 | 11/2001 | Baerlocher et al. | |
| 6,375,567 B1 | 4/2002 | Acres | |
| 6,375,570 B1 | 4/2002 | Poole | |
| 6,413,162 B1 | 7/2002 | Baerlocher et al. | |
| 6,481,713 B2 | 11/2002 | Perrie et al. | |
| 6,517,432 B1 | 2/2003 | Jaffe | |
| 6,537,150 B1 | 3/2003 | Luciano et al. | |
| 6,544,120 B2 | 4/2003 | Ainsworth | |
| 6,547,242 B1 | 4/2003 | Sugiyama et al. | |
| 6,551,187 B1 | 4/2003 | Jaffe | |
| 6,554,704 B2 | 4/2003 | Nicastro et al. | |
| 6,558,254 B2 | 5/2003 | Baelocher et al. | |
| 6,561,900 B1 | 5/2003 | Baerlocher et al. | |
| 6,565,434 B1 | 5/2003 | Acres | |
| 6,641,477 B1 | 11/2003 | Dietz | |
| 6,652,378 B2 | 11/2003 | Cannon et al. | |
| 6,656,040 B1 | 12/2003 | Brosnan et al. | |
| 6,657,923 B2 | 12/2003 | Laughlin | |
| 6,692,356 B2 | 2/2004 | Baerlocher et al. | |
| 6,702,675 B2 | 3/2004 | Poole et al. | |
| 6,731,313 B1 | 5/2004 | Kaminkow | |
| 6,786,818 B1 | 9/2004 | Rothschild et al. | |
| 6,832,957 B2 | 12/2004 | Falconer | |
| 6,837,790 B1 | 1/2005 | Kaminkow | |
| 6,869,360 B2 | 3/2005 | Marks et al. | |
| 6,896,617 B2 | 5/2005 | Daly | |
| 6,910,962 B2 | 6/2005 | Marks et al. | |
| 6,916,243 B2 | 7/2005 | Yoshida | |
| 6,918,834 B2 | 7/2005 | Vancura | |
| 6,926,609 B2 | 8/2005 | Martin | |
| 6,960,134 B2 | 11/2005 | Hartl et al. | |
| 7,018,293 B2 | 3/2006 | Brown et al. | |
| 7,029,395 B1 | 4/2006 | Baerlocher | |
| 7,029,396 B2 | 4/2006 | Jaffe et al. | |
| 7,121,945 B2 | 10/2006 | Suganuma et al. | |
| 7,156,740 B2 | 1/2007 | Kaminkow | |
| 7,179,169 B2 | 2/2007 | Beaulieu et al. | |
| 7,252,591 B2 | 8/2007 | Van Asdale | |
| 7,316,613 B2 | 1/2008 | Luccesi et al. | |
| 7,326,113 B2 | 2/2008 | Bennett et al. | |
| 7,371,170 B2 | 5/2008 | Cregan et al. | |
| 7,377,850 B2 | 5/2008 | Shackelford et al. | |
| 7,452,276 B2 | 11/2008 | Loose et al. | |
| 7,458,890 B2 | 12/2008 | Loose et al. | |
| 7,488,252 B2 | 2/2009 | Griswold et al. | |
| 7,503,847 B2 | 3/2009 | Baerlocher | |
| 7,526,736 B2 | 4/2009 | Kaminkow et al. | |
| 7,553,231 B2 | 6/2009 | Rodgers et al. | |
| 7,578,735 B2 | 8/2009 | Frizzell et al. | |
| 7,601,062 B2 | 10/2009 | Cole et al. | |
| 7,604,538 B2 | 10/2009 | Pacey | |
| 7,625,278 B2 | 12/2009 | Paulsen et al. | |
| 7,654,895 B2 | 2/2010 | Pacey | |
| 7,654,899 B2 | 2/2010 | Durham et al. | |
| 7,699,699 B2 | 4/2010 | Gilliland et al. | |
| 7,704,141 B1 | 4/2010 | Marks et al. | |
| 7,744,460 B2 | 6/2010 | Walker et al. | |
| 7,785,191 B2 | 8/2010 | Marks et al. | |
| 7,819,742 B2 * | 10/2010 | Chamberlain | G07G 5/00 463/16 |
| 7,841,934 B2 | 11/2010 | Gauselmann | |
| 7,980,936 B2 | 7/2011 | Mead | |
| 8,021,225 B2 | 9/2011 | Okada | |
| 8,066,563 B1 | 11/2011 | Schultz et al. | |
| 8,083,581 B2 | 12/2011 | Marks et al. | |
| 8,105,145 B2 | 1/2012 | Jaffe | |
| 8,105,151 B2 | 1/2012 | Caputo et al. | |
| 8,147,322 B2 | 4/2012 | Walker et al. | |
| 8,162,740 B2 | 4/2012 | Aoki | |
| 8,162,741 B2 | 4/2012 | Wadleigh et al. | |
| 8,192,275 B2 | 6/2012 | Aoki et al. | |
| 8,246,442 B1 | 8/2012 | Barrie | |
| 8,287,357 B2 | 10/2012 | Evans | |
| 8,323,091 B2 | 12/2012 | Frank et al. | |
| 8,357,041 B1 | 1/2013 | Saunders | |
| 8,360,851 B2 | 1/2013 | Aoki et al. | |
| 8,366,538 B1 | 2/2013 | Saunders et al. | |
| 8,371,930 B1 | 2/2013 | Saunders et al. | |
| 8,388,432 B2 | 3/2013 | Mattice et al. | |
| 8,414,380 B2 | 4/2013 | Saunders et al. | |
| 8,465,358 B2 | 6/2013 | Kemper | |
| 8,496,522 B2 | 7/2013 | Caputo et al. | |
| 8,512,121 B2 | 8/2013 | Macvittie et al. | |
| 8,512,124 B2 | 8/2013 | Bramble et al. | |
| 8,512,138 B2 | 8/2013 | Saunders | |
| 8,523,659 B2 | 9/2013 | Evans | |
| 8,574,059 B2 | 11/2013 | Rodgers et al. | |
| 8,602,868 B2 | 12/2013 | Johnson et al. | |
| 8,608,545 B2 | 12/2013 | Arora et al. | |
| 8,662,986 B2 | 3/2014 | Rodgers et al. | |
| 8,690,660 B2 | 4/2014 | Saunders et al. | |
| 8,696,434 B2 | 4/2014 | Tsukahara | |
| 8,702,487 B2 | 4/2014 | Thomas | |
| 8,790,169 B2 | 7/2014 | Saunders | |
| 8,795,059 B2 | 8/2014 | Aoki et al. | |
| 8,821,254 B2 | 9/2014 | Tsukahara | |
| 8,834,258 B2 | 9/2014 | Gobe et al. | |

(56) References Cited

U.S. PATENT DOCUMENTS 8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,123,209 B2 9/2015 Pacey et al.
9,165,433 B2 10/2015 Caputo
9,202,345 B2 12/2015 Zoltewicz et al.
9,215,524 B2 12/2015 Mckinnon et al.
9,230,410 B2 1/2016 Saunders et al.
9,245,421 B2 1/2016 Saunders et al.
9,251,667 B2 2/2016 Marks et al.
9,257,011 B2 2/2016 Kitamura et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,928,691 B2 3/2018 Olive
10,013,855 B2 7/2018 Nakamura
10,037,651 B2 7/2018 You et al.
10,043,350 B2 8/2018 Gomez et al.
10,204,473 B2 2/2019 Lenger
10,242,533 B2 3/2019 Okada et al.
10,258,869 B2 4/2019 Ludwick
10,339,761 B2 7/2019 Olive
10,366,575 B2 7/2019 Visser
10,388,112 B2 8/2019 You et al.
10,417,877 B2 9/2019 Gomez et al.
10,475,294 B2 11/2019 Gomez et al.
10,497,203 B2 12/2019 Elmqvist
10,546,450 B2 1/2020 Ito et al.
10,643,431 B2 5/2020 Chesworth et al.
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064796 A1 4/2003 Glavich et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Noue
2004/0023714 A1 2/2004 Asdale
2004/0043815 A1 3/2004 Kaminkow
2004/0048646 A1 3/2004 Msocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0068873 A1 3/2006 Gomez
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0124326 A1 5/2009 Caputo et al.
2009/0156287 A1 6/2009 Baumgartner
2009/0181755 A1 7/2009 Gagner et al.
2009/0227356 A1 9/2009 Moroney
2009/0239634 A1 9/2009 Nguyen
2009/0291741 A1 11/2009 Schofield
2010/0016055 A1 1/2010 Englman
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0111824 A1 5/2011 Cuddy et al.
2011/0130192 A1 6/2011 Englman et al.
2011/0230251 A1 9/2011 Nicely et al.
2011/0244943 A1 10/2011 Milford et al.
2011/0300937 A1 12/2011 Crowder, Jr. et al.
2012/0015707 A1 1/2012 Hornik et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 McAllister et al.
2013/0065663 A1 3/2013 Johnson et al.
2013/0102375 A1 4/2013 Aoki et al.
2013/0260861 A1 10/2013 Vann et al.
2014/0014186 A1 1/2014 Bhattacharya et al.
2014/0024429 A1 1/2014 Aoki et al.
2014/0031101 A1 1/2014 Jaffe et al.
2014/0051496 A1 2/2014 Meyer
2014/0066170 A1 3/2014 Aoki et al.
2014/0141860 A1 5/2014 Meyer
2014/0179396 A1 6/2014 Aoki et al.
2014/0274281 A1 9/2014 Jaffe
2014/0274292 A1 9/2014 Suda
2014/0323198 A1 10/2014 Tuck
2015/0031437 A1 1/2015 Gomez et al.
2015/0170462 A1 6/2015 Berman et al.
2015/0206386 A1 7/2015 Jaffe et al.
2015/0269809 A1 9/2015 Smith
2015/0287269 A1 10/2015 Berman
2015/0348359 A1 12/2015 Comeau et al.
2015/0356833 A1 12/2015 Aoki et al.

(56) References Cited

U.S. PATENT DOCUMENTS

| | | | | |
|---|---|---|---|---|
| 2015/0379831 | A1 | 12/2015 | Lee et al. | |
| 2016/0042597 | A1 | 2/2016 | Olive | |
| 2016/0086448 | A1 | 3/2016 | Aoki et al. | |
| 2016/0155303 | A1 | 6/2016 | Aoki et al. | |
| 2017/0092070 | A1 | 3/2017 | Marston et al. | |
| 2017/0154498 | A1 | 6/2017 | Olive | |
| 2017/0372558 | A1 | 12/2017 | You et al. | |
| 2018/0268655 | A1 | 9/2018 | Olive | |
| 2018/0268659 | A1* | 9/2018 | Chesworth | G07F 17/3267 |
| 2019/0236905 | A1 | 8/2019 | Washington et al. | |
| 2019/0295377 | A1 | 9/2019 | Suda et al. | |
| 2019/0304244 | A1 | 10/2019 | Kennedy et al. | |
| 2019/0340880 | A1 | 11/2019 | You et al. | |
| 2019/0347908 | A1 | 11/2019 | Bolling, Jr. | |
| 2020/0090467 | A1* | 3/2020 | Marks | G07F 17/3225 |
| 2020/0250923 | A1 | 8/2020 | Ceniceroz et al. | |
| 2020/0279457 | A1 | 9/2020 | Chesworth et al. | |
| 2020/0364982 | A1 | 11/2020 | You et al. | |
| 2021/0366226 | A1 | 11/2021 | Cohn et al. | |
| 2021/0366227 | A1 | 11/2021 | Milosevich | |
| 2021/0366236 | A1 | 11/2021 | Soong | |
| 2021/0366237 | A1 | 11/2021 | Bouvier et al. | |
| 2021/0375098 | A1 | 12/2021 | Chesworth et al. | |

FOREIGN PATENT DOCUMENTS

| | | | |
|---|---|---|---|
| AU | 2015210489 | A1 | 2/2016 |
| GB | 2097160 | B | 5/1984 |
| GB | 2144568 | B | 9/1985 |
| GB | 2251112 | A | 6/1992 |

OTHER PUBLICATIONS

"Cash Burst—Force of Babylon", Scientific Games, 2020, 5 pages.
"Lock It Link—Huff N' Puff", SG Gaming, 2017, 2 pages.
"Locked & Loaded—Huff N' Puff", SG Gaming, 2017, 2 pages.
"IGT—Bubble Blast Link", Indian Gaming, Jul. 8, 2021, retrieved from: https://www.indiangaming.com/igt-bubble-blast-ink/, 3 pages.
"Konami Launch New Prize Drop Range With a Feature Twist Players Will Love", The Drop, Dec. 17, 2019, retrieved from: https://thedrop.com.au/konami-launch-new-prize-drop-range-with-a-feature-twist-players-will-love/, 4 pages.
Zodiac Lion Class III Slot Game; IGT; Casino Journal, Mar. 5, 2020.
Zodiac Lion Slot Machine Snapshots from YouTube Video posted Aug. 15, 2019.
Ancient Arcadia game brochure, Copyright 2011 IGT.
Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
U.S. Appl. No. 17/744,988, filed May 16, 2022, 78 pages.

* cited by examiner

GAMING SYSTEMS AND METHODS USING MULTI-CYCLE AWARD SEQUENCES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations in connection with a multi-cycle award feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaining apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize a presentation assembly configured to present a plurality of symbol positions and a plurality of award options including award indicia visibly indicating a respective award value, and game-logic circuitry in communication with the presentation assembly and configured to cause the presentation assembly to present: (i) a game outcome by populating the symbol positions with a plurality of symbols and (ii) in response to the plurality of symbols include at least one trigger symbol and at least one award symbol, an award sequence comprising a cycle for each trigger symbol, each cycle of the award sequence including: selecting a respective one or more award options of the award options for each award symbol, updating award indicia for each award symbol based on the award value associated with the respective selected award options, aggregating award values indicated by the updated award indicia of the award symbols, and, in response to determining the award sequence includes one or more remaining cycles, removing the updated award indicia from the award symbols.

Additional aspects of the invention will be apparent to those of ordinary skill in the art in view of the detailed description of various embodiments, which is made with reference to the drawings, a brief description of which is provided below.

Figure 1:
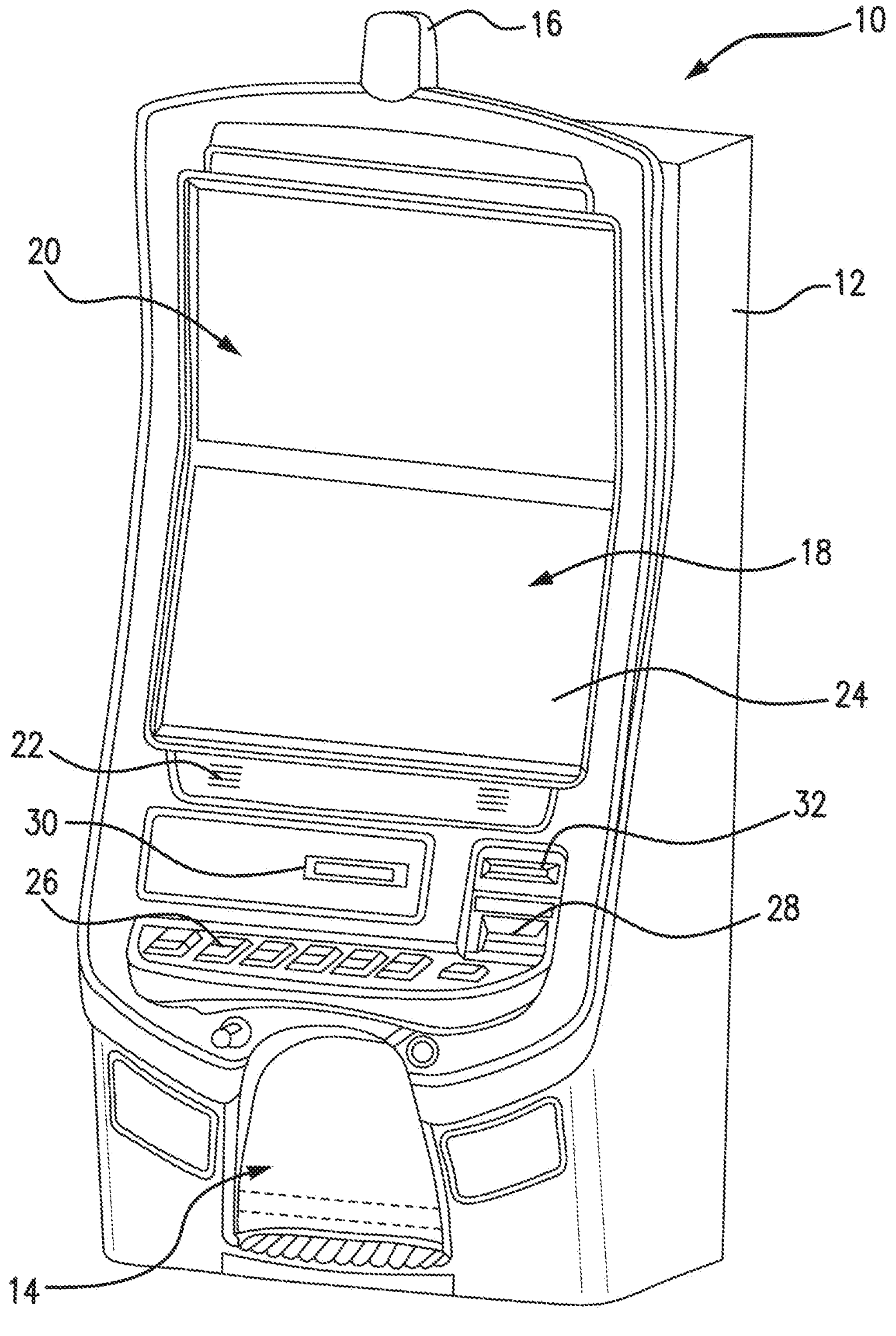
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present invention comprise an innovative application of data processing steps that, when implemented by game-logic circuitry, direct a presentation assembly to present a symbol-value collection, selection, and award process that minimizes processing overhead by utilizing numbered indicia to represent credit values instead of complex, fanciful game images. Further, the process selects displayed values borne by special award elements (i.e., award options), and applies the values to value-bearing symbols within a multi-cycle award sequence according to stored, variable criteria. In this way, the value-bearing symbols and award elements provide building blocks for innumerable different collection and selection sequences simply by manipulating the criteria associated with the value-bearing symbols and award elements, resulting in fewer rules needed for the award process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303 and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned. U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter. The physical item may, for example, be currency bills, coins, tickets, vouchers, coupons, cards, and/or computer-readable storage mediums. The deposited cash or credits are used to fund wagers placed on the wagering game played via the gaining machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the credits meter, the value output devices are used to dispense cash or credits from the gaming machine 10. The credits may be exchanged for cash at, for example, a cashier or redemption station. Examples of value output, devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
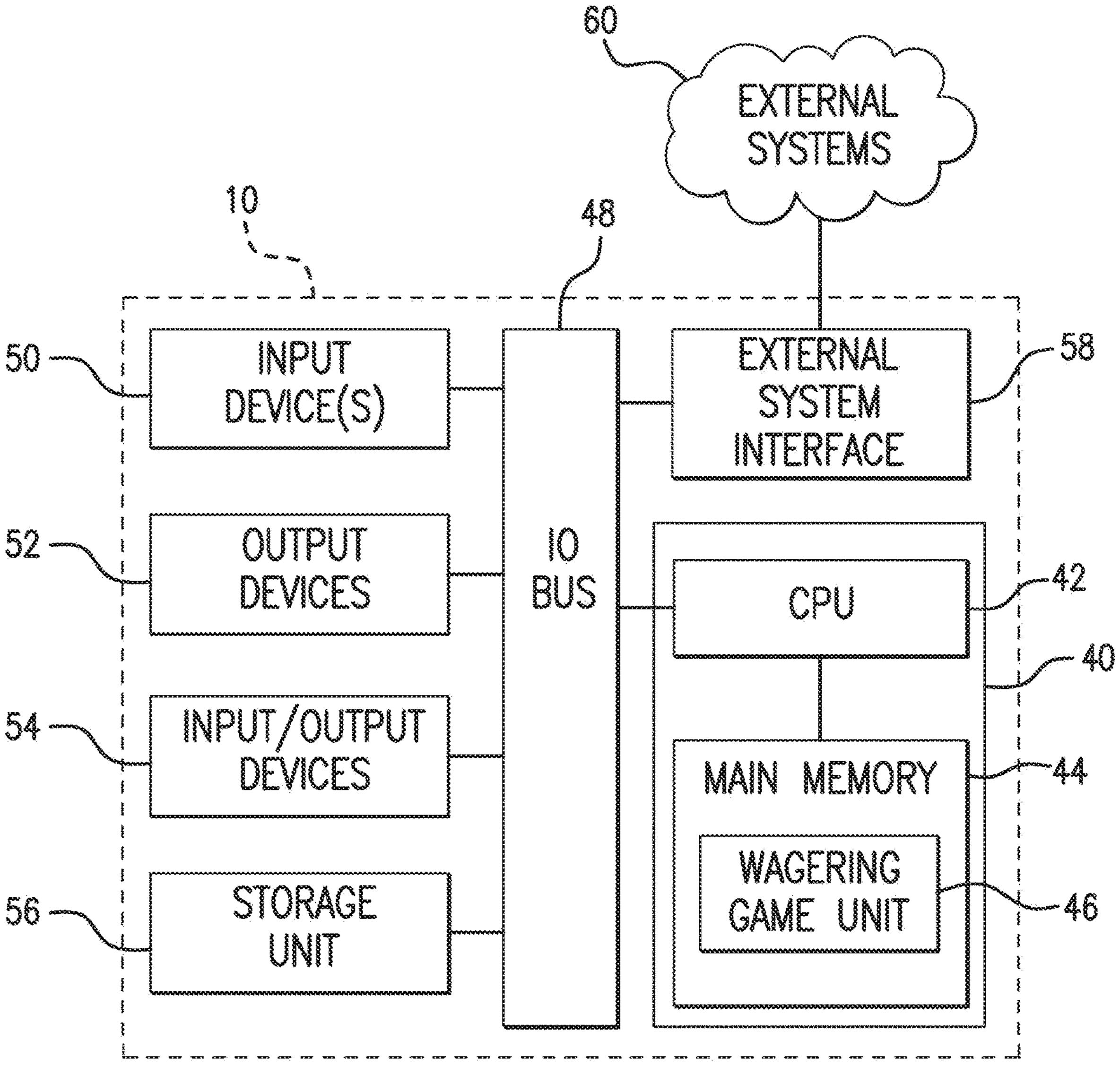
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (PO) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaining control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories international (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

The systems and methods described herein include a game feature with multi-cycle award sequences. More specifically, the award sequences include a dynamic number of cycles based on one or more trigger events or conditions. In each cycle, one or more awards may be provided, which may be selected from a plurality of selectable award options. In at least some embodiments, the number of awards provided for each cycle may be based at least in part on an award condition, such as the number of award symbols present within the cycle.

Figure 3:
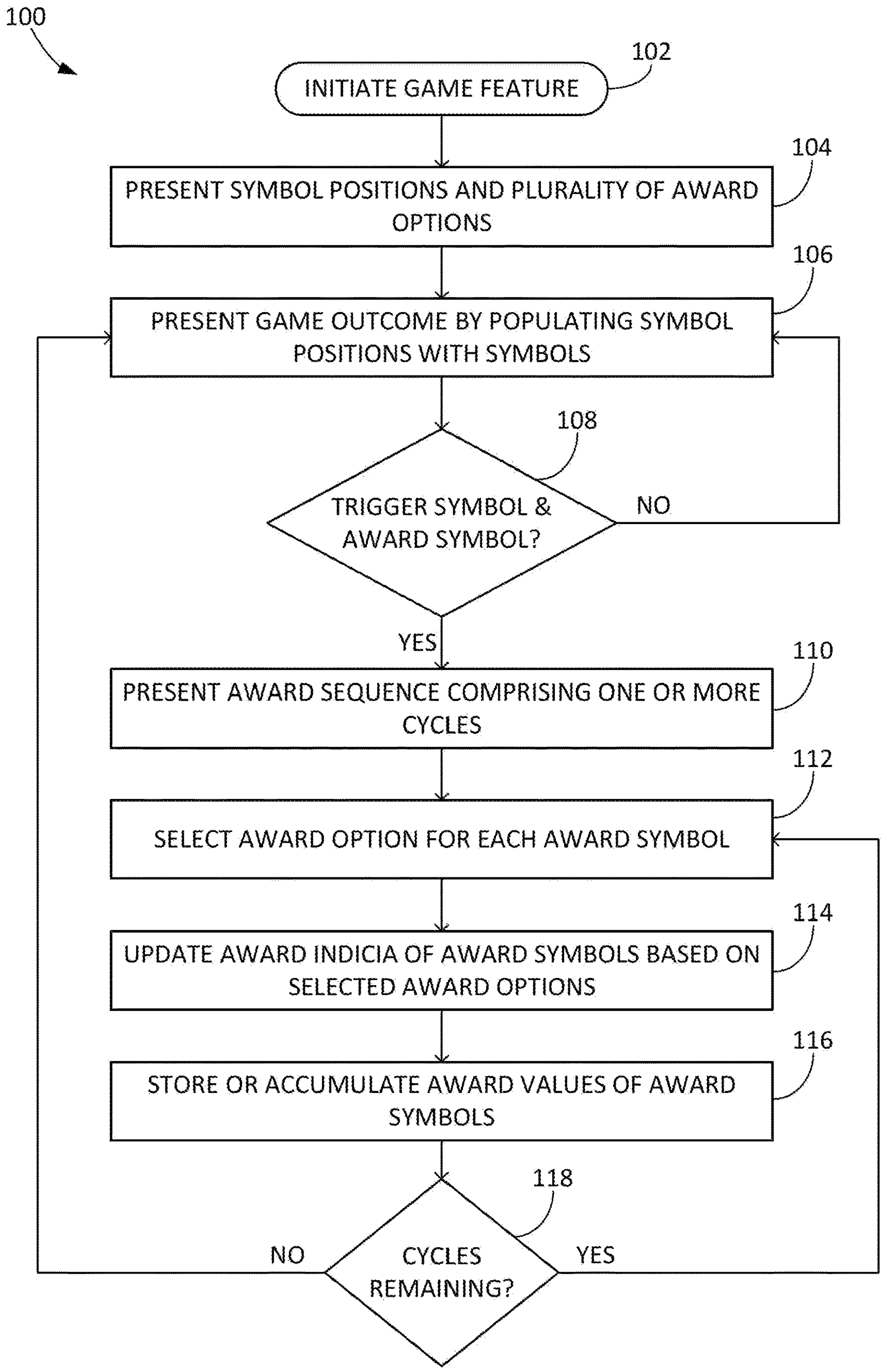
FIG. 3 is a flow diagram of an example method for conducting and presenting a multi-cycle award feature using a gaming system, according to an embodiment of the present invention.

FIG. 3 depicts an example method 100 for conducting and presenting games including multi-cycle award sequences using a gaming system (e.g., the system shown in FIGS. 1 and 2). The method 100 may be at least partially performed using game-logic circuitry of the gaming system and a presentation assembly in communication with the game-logic circuitry. The game-logic circuitry and/or the presentation assembly may be at least partially integrated within a gaming machine. In other embodiments, the method 100 may including additional, fewer, or alternative steps and/or be performed by a different configuration of devices, including those steps and configurations described elsewhere herein.

The method 100 begins at step 102 with a game feature being initiated. For a base game feature, the feature is initiated in response to initiating a gaming session at the gaming machine or in response to another game feature concluding. For a bonus game feature, the game feature is initiated in response to one or more bonus trigger events or conditions. In the example embodiment, the game feature is a base game feature, and the game feature is initiated in response to the player establishing a credit balance at the gaming machine and/or the player linking the gaming session to a player account of the player. Establishing the credit balance may include, for example, providing a physical credit input at the gaming machine (e.g., coins, bills, tickets, cards, etc.), where the gaming machine detects the physical credit input and establishes a credit balance based on the value of the physical credit input. In another example, the player establishes a credit balance by linking the gaming session to a digital wallet or account of the player (e.g., via communication with a player's personal computing device) to receive funds. The credit input may have a monetary value or non-monetary value. The player account, which may be used to dispense funds or credits to the credit balance, may additionally or alternatively provide other suitable functions associated with the gaming session, such as applying or collecting loyalty points to the gaming session, tracking player progression, and the like.

At step 104, the presentation assembly presents a plurality of symbol positions and a plurality of selectable award options. In the example embodiment, the symbol positions are organized into a symbol array with the positions organized into a plurality of rows and columns. In other embodiments, the symbol positions may be arranged in a different configuration, including configurations with a plurality of separate arrays. The symbol positions are selectively populated with symbols as described herein.

Each award option is associated with a respective award (which may overlap in value with an award of another award option) that is selectively provided as described herein. One or more of the award options may be associated with a progressive jackpot award, where the value of the award is dynamically funded through wagers and the like. In at least some embodiments, the award options include award indicia to visually indicate the corresponding award, such as text indicating the award value of the award option. The award indicia may be presented throughout the game feature or hidden for at least a portion of the game feature. For example, the award indicia of an award option may be hidden until the award option is selected within the game feature as described herein.

The award options may be presented as individual presentation elements by the presentation assembly and/or as subelements of one or more group elements. In one example, the award options are presented as a "prize board" where each award option is presented as distinctly from other award options. In another example, the award options are presented as wedges or wheels segments of one or more award wheels. Other suitable presentations of the award options and/or the symbol positions, including those described elsewhere herein, may be used to facilitate the steps of the method 100 as described herein.

At step 106, the game-logic circuitry generates a game outcome and causes the presentation assembly to present the game outcome by populating the symbol positions with symbols. Generating the outcome includes a random or partially random selection of the symbols to populate the symbol positions from one or more sets of available symbols. In one example, the symbols are provided on symbol-bearing reel strips associated with one or more respective symbol positions, and the random selection includes randomly selecting a reel stop position for each reel strip. In another example, the symbol is presented is randomly selected from a non-reel-based set of available symbols. In at least some embodiments, the random selection of the symbols may be based at least in part on weight parameters that reduce or improve the chance of randomly selecting one symbol over another. For example, the symbols (or reel stop positions) may be stored in one or more weighted tables, where one or more randomly generated values or outcomes (e.g., from the random number generator) are compared to the weight parameters to determine the selection. In certain embodiments, for a given outcome, one or more symbol positions (including all of the positions) may be left blank. In such embodiments, the "blank" may be treated like a symbol, where the blank is included in the set of available symbols and randomly selected similar to the symbols. In some embodiments, the game outcome may include additional or alternative determinations that are presented by the presentation assembly, such as game determinations involving game elements other than the symbol positions.

Presenting the game outcome may include one or more animations to visually indicate to the player that a new game outcome is present. For example, with reel-based symbol population, the reels may be animated to spin and stop on the symbols forming the game outcome. Other suitable animations for presenting the game outcome may be used and considered are within the spirit and scope of the present disclosure.

In the example embodiment, the available symbols for a given game outcome includes one or more trigger symbols and one or more award symbols. The trigger symbols and the award symbols include visual elements to distinguish the trigger and award symbols from other types of symbols. In some embodiments, the trigger and/or award symbols include other functions beyond the functions described herein. In one example, the trigger and/or award symbols are modified versions of other symbols that preserve the functions of the original symbol, such as determining winning outcomes based on line pays or scatter pays. In another example, the trigger and/or award symbols function as special symbols, such as wild symbols. In certain embodiments, trigger symbols and/or the award symbols may be available for a subset of the symbol positions. In one example, the trigger symbols are limited to a column of the symbol array, while the award symbols are limited to one or more other columns of the array.

At step 108, the game-logic circuitry determines whether or not the game outcome includes at least one trigger symbol and at least one award symbol. If no trigger symbols or award symbols are detected, the game-logic circuitry performs other outcome determinations (e.g., detecting line pays or scatter pays) and generates a subsequent outcome at step 106. In some embodiments, the trigger symbols and/or the award symbols may be configured to provide additional functions that are active when the other symbol is not present in the game outcome. For example, the trigger symbol and/or the award symbol may act as a wild symbol or add wild symbols to the symbol positions, or the award symbols may include award indicia to visually indicate a corresponding award that is provided irrespective of the presence of a trigger symbol (or only when no trigger symbol is detected). In another example, the trigger symbols and/or the award symbols may be held within the symbol positions for a predetermined number of game outcomes or until the other symbol type is detected in the symbol positions. In a further example, the trigger and/or award symbols include indicia indicating aspects of the game feature described herein, such as a corresponding award value, number of cycles of an award sequence, and the like.

If at least one trigger symbol and at least one award symbol is detected in the game outcome, the method 100 proceeds to step 110, where the presentation assembly presents an award sequence associated with the trigger and award symbols. The award sequence has a dynamic length based at least in part on the number of trigger symbols within the game outcome. That is, the award sequence includes one or more cycles based at least in part on the number of trigger symbols. In the example embodiment, the number of cycles matches the number of trigger symbols. In other embodiments, the number of cycles is determined at least partially as a function of the number of trigger symbols such that the number of cycles may not match the number of trigger symbols. For example, the game-logic circuitry may store a table linking the number of cycles to a number of trigger symbols, and the game-logic circuitry performs a lookup function within the table to determine the number of cycles. In another example, the trigger symbols include indicia that indicate the number of cycles. In such an example, the number of cycles may be an aggregate number indicated by the indicia of all trigger symbols, the aggregate number from a subset of the trigger symbols, or the highest number indicated by one of the trigger symbols. The presentation assembly may be updated to reflect the number of cycles for a given award sequence.

For a given cycle of the award sequence, the game-logic circuitry selects a respective award for each award symbol in the outcome from the award options at step 112. The selection of an award option is at least partially random and may be based on weight parameters associated with each award option. In some embodiments, all award options are available for selection for each award symbol such that one award option may be selected for multiple award symbols. In other embodiments, the award options may be selected once for a given cycle or the award sequence as a whole such that each award symbol is uniquely associated with one award option (though the corresponding award value may be shared with multiple award options). In one or more embodiments, the selected award options may be removed for subsequent game outcomes and/or award sequences and/or may be replaced by other award options. In certain embodiments, the game-logic circuitry may select more than one award option for one or more of the award options. In such embodiments, the number of award options selected for a given award symbol may be random, based on one or more game conditions, and/or predefined. In some embodiments, the selection process may include a chance that no award option is chose for one or more award symbols. In essence, in addition to the probability of selecting one of the award options, there is a probability of no award option being chosen for a give award symbol.

At step 114, the presentation assembly updates award indicia of the award symbols based on the award values of the selected award options. The award indicia of the award symbols, similar to the award indicia of the award options, visually indicates a corresponding award value for the symbol. For the initial cycle, the award indicia may be added to the award symbols, or the award indicia may be initially presented with the award symbols and updated in response to the selection at step 112. In one or more embodiments, the award symbols may include initial award indicia that may be awarded in response to the award sequence being triggered and/or other suitable game events or conditions, including events and conditions external to the game feature described herein. In subsequent cycles, the award indicia may be updated to replace the award indicia from the previous cycle or to add the selected award option to the preexisting value indicating by the award indicia. In certain embodiments, the award symbols do not include award indicia, but rather an award meter associated with the award symbols is updated in response to the selections for each award symbol.

At step 116, the game-logic circuitry stores or accumulates the award values of the award symbols for the cycle. That is, the values selected for each cycle is preserved to be provided as one or more awards with the award sequence. In one example, at the end of a cycle, the award values indicated by the award symbols are provided to the credit balance as an aggregated award such that the award indicia of the award symbols are reset for the next cycle. The resetting of the award indicia may occur at step 114 of the next cycle (i.e., the indicia is replaced with new award indicia from the next cycle). In another example, the award indicia of the award symbols is updated to add the selected award value to the preexisting value of the symbol such that the values of the award symbols are provided at the conclusion of the award sequence. In a further example, the presentation assembly is configured to present award indicia on one or more trigger symbols, an award meters, and/or other presentation elements representing the aggregated award value for each game cycle. In yet another example, the aggregated value is stored in a manner hidden from view at least until the conclusion of the cycles. It is to be understood that other presentations and animations may be used to store or accumulate the award values, including those described elsewhere herein.

At step 118, the cycle is completed, and the game-logic circuitry determines whether or not any cycles remain. If no cycles remain, the award sequence is concluded, and the step 106 is repeated for a subsequent game outcome. The award sequence may include one or more steps, presentations, animations, and the like following the conclusion of the cycles. For example, the award sequence may include a presentation of an aggregate award across all cycles at the end of the award sequence. In another example, the award sequence may conclude with resetting some or all of the award options such that a new set of award options is available for a subsequent award sequence. If one or more cycles remain in the award sequence, the gaming system repeats steps 112-118 for each of the remaining cycles. In some embodiments, the presentation assembly is configured to include presentation elements and/or animations that enable a player to visually determine how many cycles remain. In one example in which the number of trigger symbols corresponds to the number of cycles, a trigger symbol may be visually altered in response to the conclusion of a cycle.

In certain embodiments, the award sequence may not include a predefined number of cycles and/or awards per cycles. For example, the number of cycles may change in response to one or more random determinations, such as at the conclusion of one cycle and prior to the next cycle. The number of awards selected may vary between cycles (e.g., award options are not selected for one or more award options). In some embodiments, the trigger symbols, award symbols, and/or other symbols within the symbol positions may change between cycles of the award sequence. For example, trigger symbols and/or award symbols may be added or removed in response to events occurring within the award sequence, like a trigger symbol is removed at the conclusion of each cycle or an award symbol is added for each subsequent cycle. In another example, the symbols may be removed or added through outcomes generated within the award sequence, such as the empty or blank symbol positions have a chance of receiving new trigger symbols and/or award symbols.

In at least some embodiments, the game feature includes other symbols beyond those described with respect to the method 100. In one example, the game feature includes one or more modifier symbols. The modifier symbols are associated with one or more modifiers that modify the award values associated with the award options and/or the award symbols. The modifier symbols may include, for example and without limitation, multipliers, award additions, award replacements, new award options, and the like. In certain embodiments, the modifier symbols may also include symbols with functions beyond the award options and/or award symbols, such as adding free spins, adding symbol positions (e.g., expanding the array size), holding trigger and/or award symbols in the symbol positions, and the like.

In the example embodiment, the game feature associated with the method 100 is a base game feature. The game feature may be associated with a bonus game feature that has similar functionality to the base game. The bonus game feature may be triggered by a bonus game trigger event, such as a particular symbol or combination of symbols occurring in a game outcome of the base game. In one example, the bonus game feature holds trigger symbols and/or award symbols for multiple game outcomes, thereby increasing the chance and/or the length of an award sequence. In another example, the bonus game feature includes expanding the symbol array to include more symbol positions (e.g., adding a row of symbol positions), thereby increasing the chance of more trigger and/or award symbols occupying the symbol array. In a further example, the bonus game feature may include different weight parameters for the trigger symbols and/or the award symbols to increase the probability of the game outcome including these symbols. In certain embodiments, the enhancements described above may be triggered within the base game feature through one or more trigger events, such as the presence of a particular symbol in the game outcome.

FIGS. 4A-4H depict an example game interface 200 presented by a gaming system (e.g., the system shown in FIGS. 1 and 2) according to one or more embodiments of the present disclosure. That is, the interface 200 is presented by a presentation assembly of the gaming system in communication with game-logic circuitry to conduct and present a game feature according to the present disclosure. In the example embodiment, the interface 200 includes a symbol array 202 and a plurality of award options 204. In other embodiments, the interface 200 includes additional, fewer, or alternative game and/or presentation elements, including those described elsewhere herein. For example, the interface may include additional arrays 202, different configurations of symbol positions, a different configuration of award options 204, and the like.

Figure 4A:
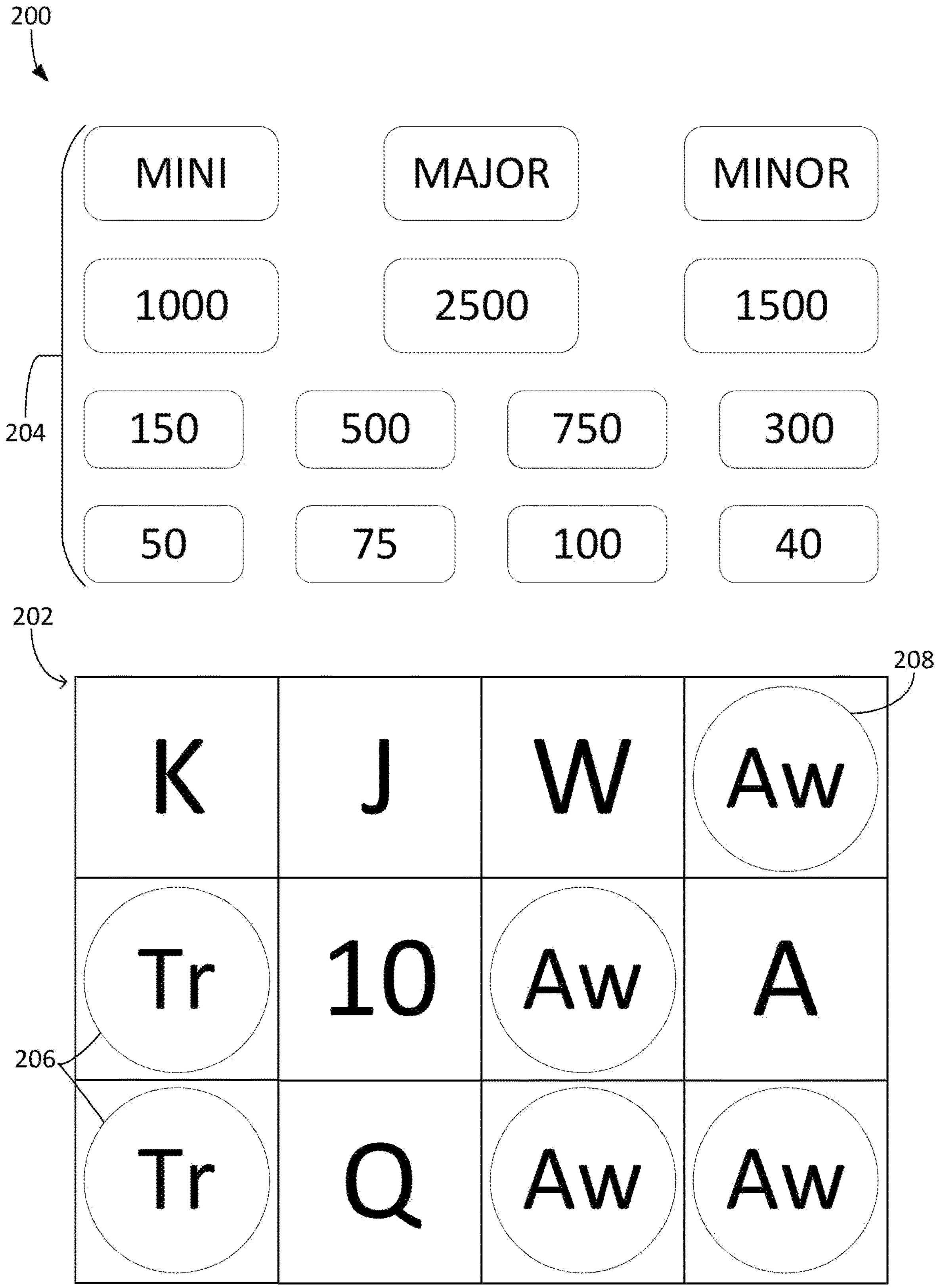
FIG. 4A is an example game interface of a gaming system in a first state, according to an embodiment of the present invention.

In the example embodiment, the symbol array 202 is a plurality of symbol positions arranged into rows and columns. The symbol array 202 is depicted in FIG. 4A in a configuration with three rows and four columns of uniform size. In other embodiments, the symbol array 202 may have a different number of rows and/or columns, including configurations with non-uniform rows and/or columns. That is, one row or column may have a different number of symbol positions relative to another row or column of the array 202. In other embodiments, the symbol positions are not arranged in a single array configuration, but rather are arranged in a different configuration according to the underlying game feature. In certain embodiments, the array 202 is dynamically adjusted within a gaming session to include additional or fewer symbol positions as described herein. In such embodiments, the array 202 may have a default configuration that the array 202 returns to following the conclusion of the event or condition causing the change in array configuration.

The award options 204 are arranged in a prize board configuration above the symbol array 202. That is, each award option 204 is presented separate from other award options. In the example embodiment, the award options include award indicia that visually indicate a corresponding award associated with the respective award option. Although the award indicia are depicted within the presentation element of the award options 204, it is to be understood that additional or alternative indicia, including indicia external to the award options 204, may be used. In the example embodiment, the award indicia is text-based and indicates a credit value or jackpot value associated with the respective award option. For the jackpot values ("MINI," "MAJOR," and "MINOR"), the indicia may be linked to a corresponding progressive jackpot meter that indicates the current value of the progressive jackpot. In certain embodiments, this jackpot meter is incorporated within the award indicia. Other suitable progressive values may be tied to the award options 204. In the example embodiment, the award indicia of the award options 204 are visible throughout the gaming session with the interface 200. In other embodiments, one or more award indicia (including all award indicia) may be hidden from view until a reveal trigger is detected, such as the corresponding award option 204 being selected.

In the example embodiment, the interface 200 includes fourteen award options 204. In other embodiments, the award options 204 may include additional or fewer award options and/or award options with different corresponding values. The award options 204 used to populate the interface 200 may be predefined, linked to one or more progressively funded meters, random, selected from one or more predefined ranges or sets of values, and/or based on game events or conditions, such as the wager amount and/or frequency of the player. In one example, the award options 204 may be grouped into similar value tiers or levels such that the same or substantially similar value selection occurs for each option 204 within the same value tier (e.g., each value tier may be represented as one or more rows of the prize board). In such an example, the game feature is configured to provide a predefined number of jackpot, high value, and low value award options 204 to the interface 200 for selection. In other embodiments, the number of award options 204 within each value tier may be at least partially random (e.g., selected from a range of numbers).

In some embodiments, the award values associated with one or more of the award options 204 may be dynamically changed throughout the gaming session. The changing of award values may occur, for example, in response to the award option 204 being selected predefined number of times, the player changing wager denominations, a period of time or number of game outcomes expiring, and/or other suitable events or conditions associated with the game feature. Additionally or alternatively, award options may be added or removed from the award options 204 throughout the gaming session. For example, a bonus game feature may remove lower-valued award options 204 to increase the chance of the player receiving high-value award options 204.

FIG. 4A depicts the game interface 200 in a first state. In the first state, a game outcome is presented on the interface 200. More specifically, the symbol array 202 is populated with a plurality of symbols. In some embodiments, one or more symbol positions may be left blank (i.e., no symbol occupies the position) in game outcomes. In the example embodiment, the symbols populating the symbol array 202 includes two trigger symbols 206 and four award symbols 208. The trigger symbols 206 and the award symbols 208 are visually distinct from each other and other symbols in the array 202. The other symbols may be used to determine game outcomes beyond the award sequence described herein. In certain embodiments, the trigger symbols 206 and/or the award symbols 208 are configured to include functionality similar to these other symbols. For example, the trigger symbols 206 may act a wild symbols, and the award symbols 208 may be modified versions of standard symbols (e.g., "A," "K," "Q," "J," and "10").

In the example embodiment, the presence of both trigger symbols 206 and award symbols 208 in the game outcome causes the game-logic circuitry to initiate an award sequence. As described above with respect to FIG. 3, the award sequence has a dynamic length and a dynamic number of awards based on the number of trigger symbols 206 and award symbols 208, respectively. In at least some embodiments, the number of trigger symbols 206 and/or award symbols 208 on a given outcome may be limited to avoid the award sequence extending beyond a desirable length, which may result in player disinterest, computing resource burdens, and/or the award sequence reducing the availability of winning outcomes in other aspects of the gaming session to maintain a desirable payback percentage. In one example, the trigger symbols 206 and/or the award symbols 208 are limited to particular columns of the symbol array 202 (e.g., the trigger symbols 206 only appear in the leftmost column, while the award symbols 208 only appear in the two rightmost columns). Other suitable means of limiting the number of trigger symbols 206 and/or award symbols 208 may be used, such as setting maximums in the game logic.

In the example embodiment, and as described herein, the award sequence includes two cycles based on the number of trigger symbols 206, and four awards are selected from the award options 204 based on the number of award symbols 208 for each cycle. In other embodiments, other suitable number of cycles and/or awards may be provided for the award sequence based at least partially on the number of trigger symbols 206 and/or the award symbols 208. In one example, the trigger symbols 206 include trigger indicia that indicates a number of cycles associated with the respective symbol 206. In another example, one award is selected for each cycle, and the award symbols 208 are configured to modify the selected award value.

Figure 4B:
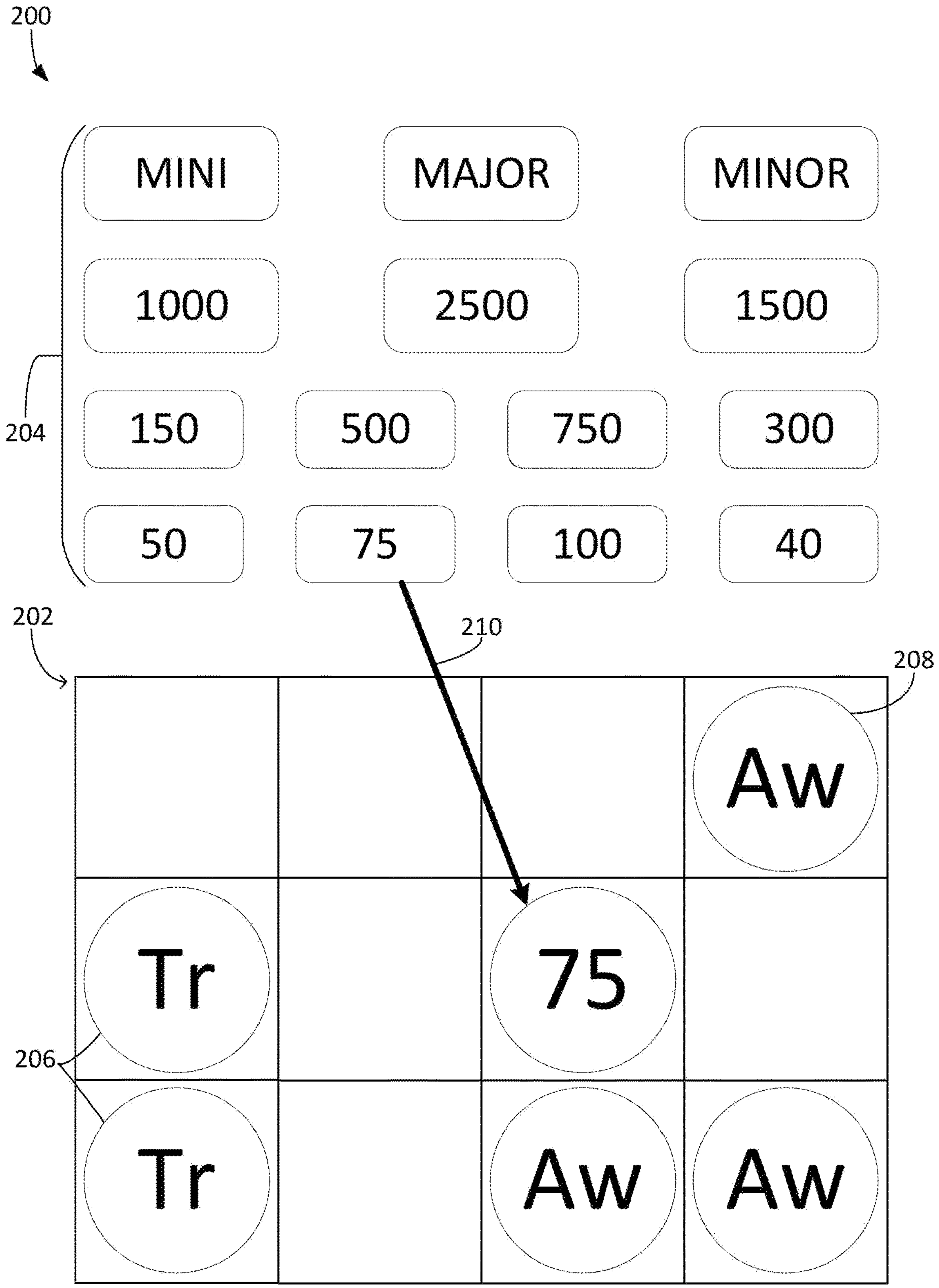
FIG. 4B is the game interface shown in FIG. 4A in a second state, according to an embodiment of the present invention.

FIG. 4B depicts the game interface 200 in a second state subsequent to the first state. FIGS. 4B-4H depict the symbol array 202 partially filled with the symbols relevant to the award sequence for clarity purposes. In some embodiments, the other symbols may remain in the symbol array 202. In such embodiments, these symbols may be visually reduced in focus relative to the symbols associated with the award sequence or remain the same. In other embodiments, the other symbols are removed from the symbol array 202. In certain embodiments, during the award sequence, symbol positions of the array 202 that do not include the symbols associated with the award sequence may be hidden or reduced in visual focus relative to the symbol positions associated with the award sequence. The changes resulting from the award sequence may be reverted at the conclusion of the award sequence and/or during the next game outcome.

In the second state, the first cycle of the award sequence is ongoing. More specifically, the game-logic circuitry is selecting award options 204 for each award symbol 208, and the presentation assembly is updating the interface 200 to reflect the selection. The award symbols 208 are updated to add or replace award indicia of the symbols 208 based on the award indicia of the selected award option 204. In the second state, the award option 204 with a credit value of '75' has been selected, and the award indicia of one of the award symbols 208 is updated to include the credit value as indicated by arrow 210.

The presentation assembly may be configured to present one or more animations and/or presentation elements to visually link the award option selection and the award symbol update together. For example, similar to the arrow 210, a lightning bolt animation may visually link the selected award option 204 to the corresponding award symbol 208 and cause the award indicia of the award symbol 208 to be updated. Other suitable animations and/or presentations may be used to visually indicate the selection of an award option 204 and changes to the award symbol 208 may be used and are considered within the spirit and scope of the present disclosure. For example, rather than animating the updates to the award symbols 208 one at, a time, all of the award symbols 208 may be updated concurrently or at least partially overlapping.

In some embodiments, the number of selected award options 204 may not match the number of award symbols 208. In one example, multiple award options 204 are selected for one award symbol 208. In such an example, the number of selected award options may be based at least partially on random values or outcomes, characteristics of the award symbols 208 (e.g., the award symbols 208 include indicia prior to the award sequence indicating a number of selections), other symbols or conditions within the symbol array 202, predefined rules, the player wager amount or frequency, and/or other suitable game events or conditions. In another example, one selected award option 204 may be applied to a plurality of the award symbols 208 (including all of the award symbols 208).

Figure 4C:
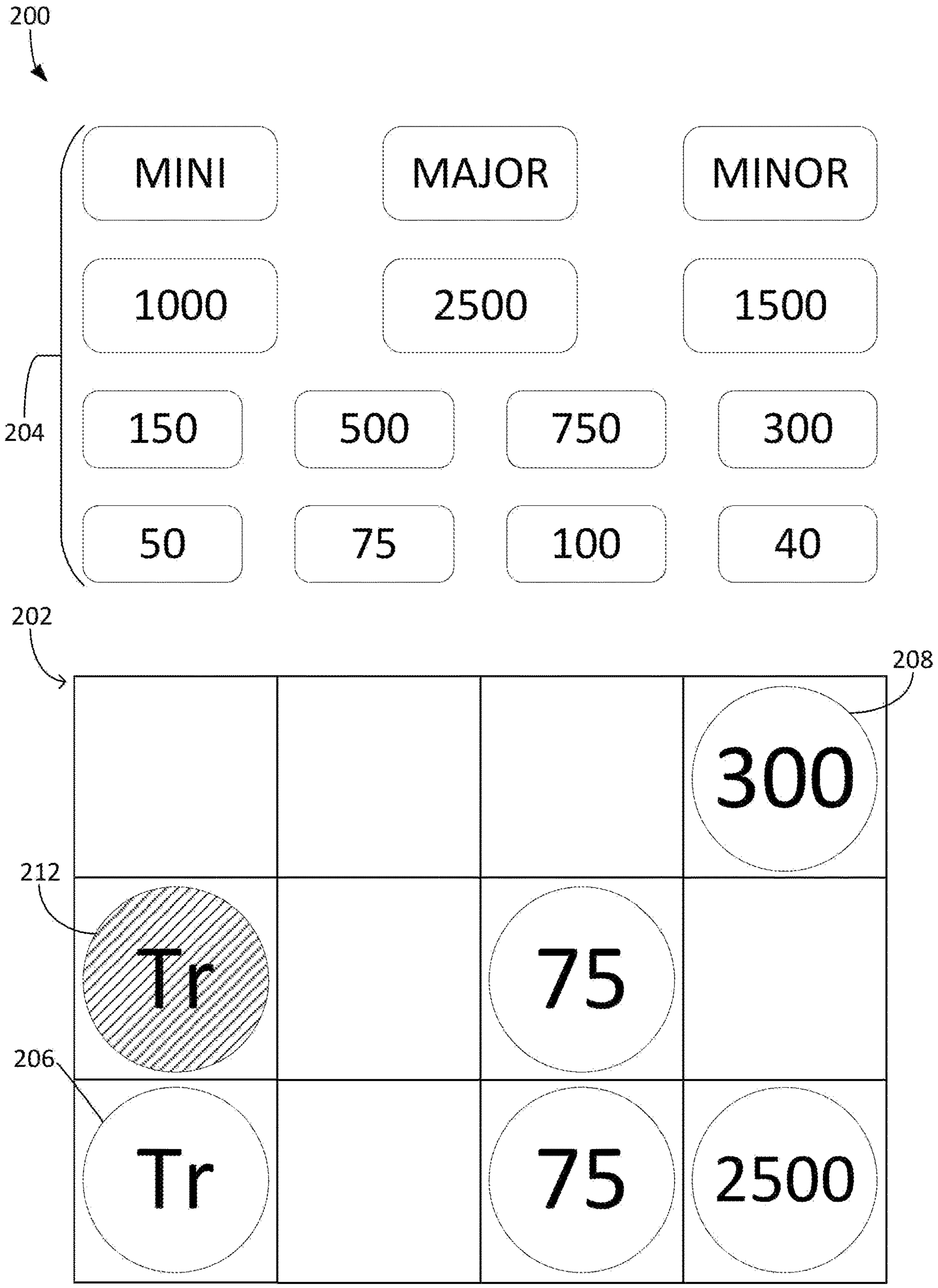
FIG. 4C is the game interface shown in FIG. 4A in a third state, according to an embodiment of the present invention.

FIG. 4C depicts the game interface 200 in a third state subsequent to the second state. In the third state, the first cycle of the award sequence is concluding. Each of the award symbols 208 have been updated with award values selected from the award options 204. In the example embodiment, at least some of the award options 204 are available to be selected multiple times as indicated by two of the award symbols 208 selecting the same award option 204. In other embodiments, each award option 204 is available for one selection per cycle. In response to an award option 204 being selected, the game-logic circuitry updates weight parameters of the remaining award options or replaces the selected award option 204 with a new award option 204, In certain embodiments, some award options 204 can be selected multiple times while other award options 204 (e.g., the progressive jackpots) can only be selected once or a limited number of times in a given cycle or award sequence.

In the example embodiment, the indicate to the player the progress through the award sequence, one of the trigger symbols 206 is visually updated at the beginning or conclusion of the first cycle. That is, trigger symbol 212 is visually distinguished from other remaining trigger symbols 206 to indicate to the player that the first cycle is beginning or concluding. The visual distinction may include, for example, changes to the presentation of the trigger symbol 212, additional or alternative presentation elements and/or animations, and the like. In other embodiments, the interface 200 may include additional or alternative presentation elements and/or animations to visually track the progress through the cycles of the award sequences. In certain embodiments, no visual indication is provided through the award sequence beyond the changes to the award symbols as described herein.

The award values of the award symbols 208 are stored or accumulated for each cycle of the award sequence such that the player is provided an aggregated award from all of the cycles. It is to be understood that the award values may be awarded all at once or within subsets (e.g., at the end of each cycle and/or for each accumulated award of the award symbols 208) through the award sequence. One or more presentation elements may be used to track the accumulated values. In one example, the award values of the award symbols 208 are accumulated at the end of each cycle and applied directly to the credit balance of the player. In another example, one or more award meters are presented to track the accumulated award values across cycles, where the award meters are applied to the credit balance at the conclusion of the award sequence. In a further example, each award symbol 208 maintains their respective values from prior cycles such that the award indicia of the symbols 208 at the end of the last cycle indicates the accumulated award value for the award symbol 208 over all of the cycles. Other suitable means of storing the accumulated award values from each cycle (including means that store the values hidden from the interface 200, such as only within one or more variables stored by the game-logic circuitry) may be used and are considered within the spirit and scope of the present disclosure.

Figure 4D:
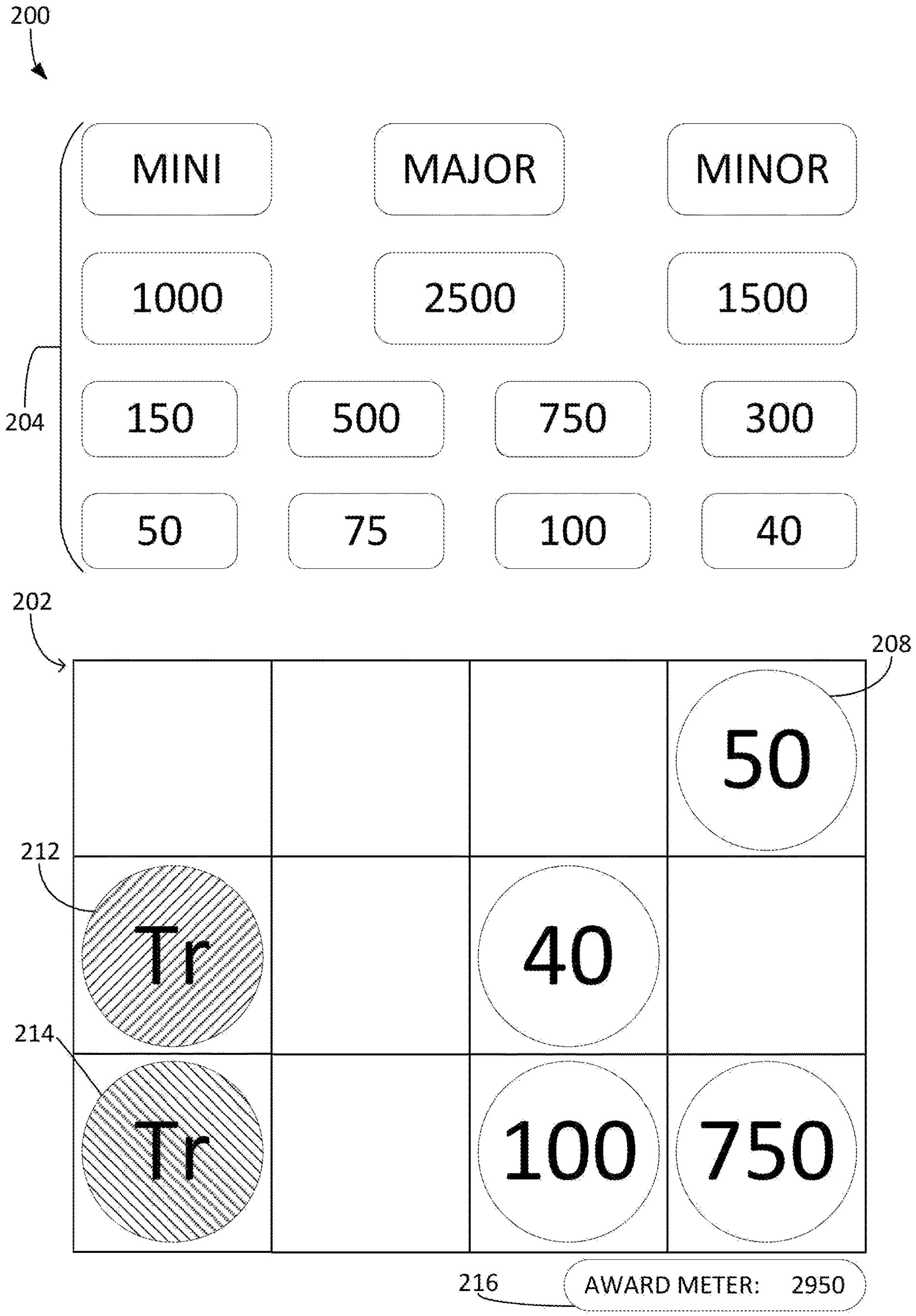
FIG. 4D is the game interface shown in FIG. 4A in a fourth state, according to an embodiment of the present invention.
Figure 4E:
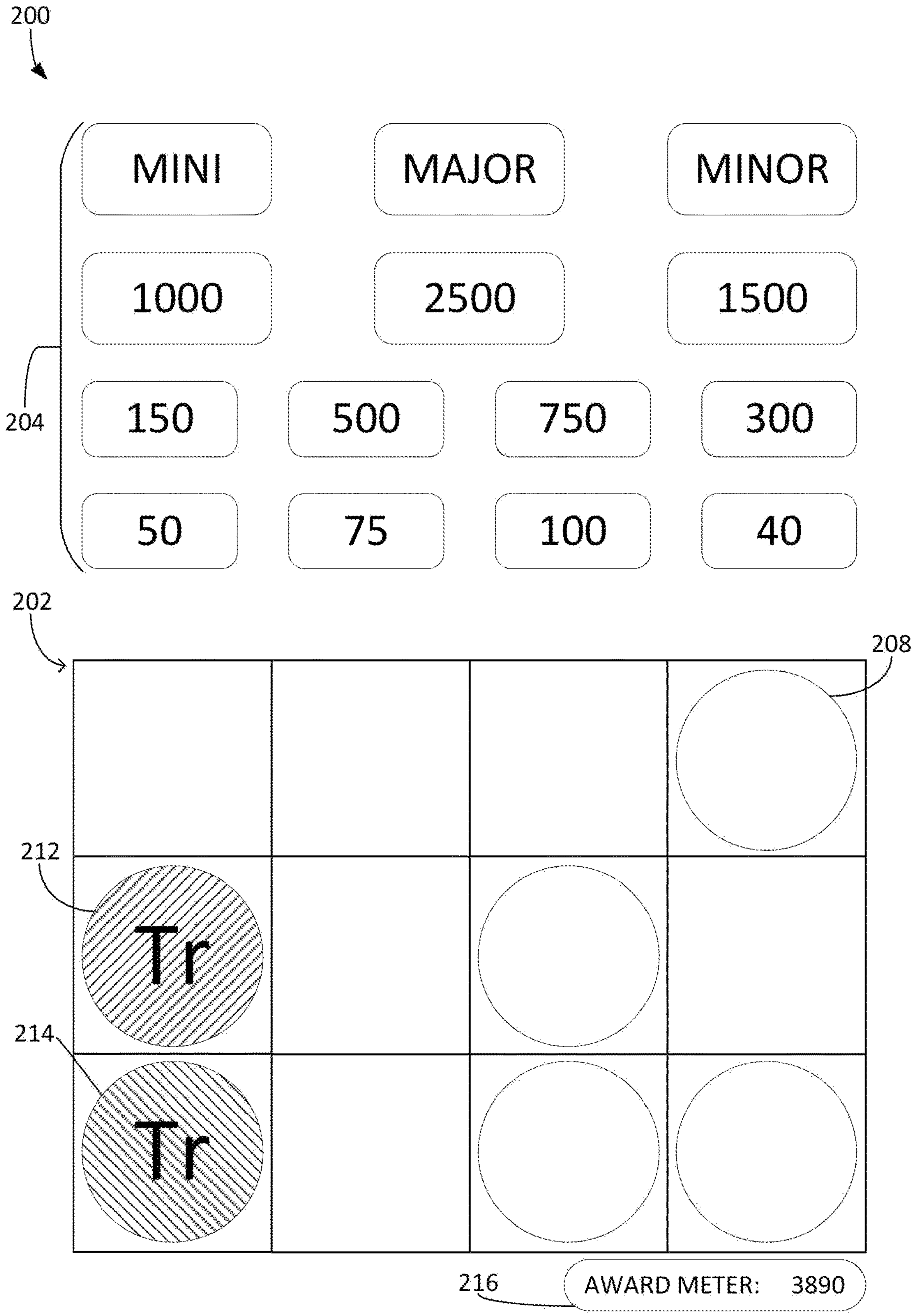
FIG. 4E is the game interface shown in FIG. 4A in a fifth state, according to an embodiment of the present invention.
Figure 4F:
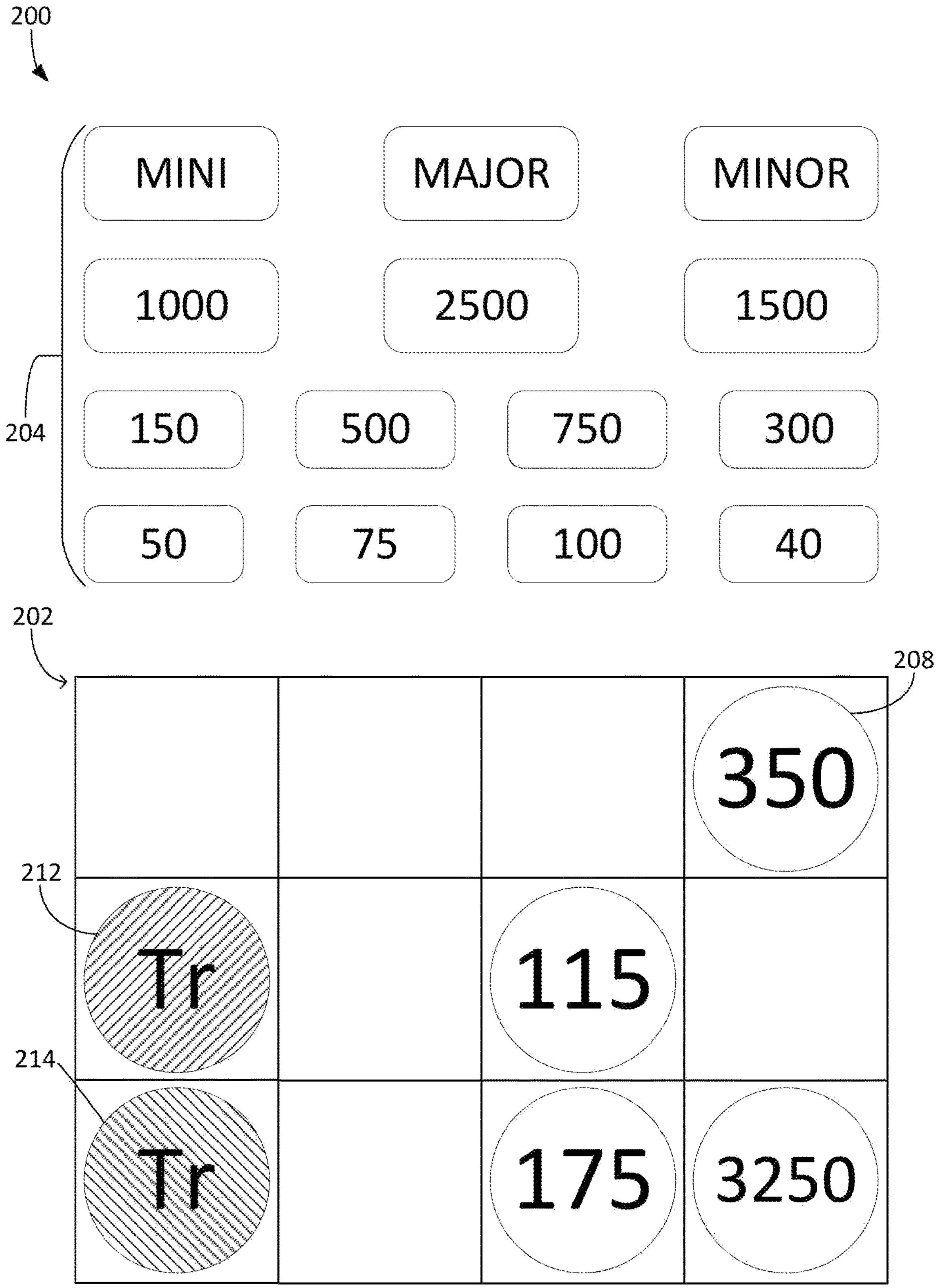
FIG. 4F is the game interface shown in FIG. 4A in a sixth state, according to an embodiment of the present invention.

FIGS. 4D and 4E depict one manner of storing the accumulated award values from the third state, while FIG. 4F depicts another manner of storing the accumulated award values from the third state. FIG. 4D depicts a fourth state following the third state. In the fourth state, the second cycle of the award sequence is ongoing. More specifically, new award values have been selected from the award options 204 and applied to the award symbols 208, and a second trigger symbol 214 of the symbols 206 has been visually modified to indicate the progress of the second cycle. To visually indicate the award values accumulated from prior cycles (which, in the illustrated case, is just the first cycle), the interface includes an award meter 216. The award meter 216 tracks the award values accumulated from the prior and current cycles. In the fourth state, the award meter 216 indicates an aggregate award value from the award symbols 208 in the first state.

In the example embodiment, between the third and fourth state, the award indicia from the first cycle are removed from the award symbols 208 and replaced with the award indicia from the second cycle. In some embodiments, the award indicia from the first cycle are removed prior to the selection of the award values for the second cycle. In other embodiments, the award indicia for the first cycle remains until the presentation assembly updates the award indicia with the selected award values for the second cycle.

FIG. 4E depicts a fifth state subsequent to the fourth state. In the fifth state, the award values from the award symbols in the second cycle have been added to the preexisting value of the award meter 216. That is, the first cycle had an aggregate award value of '2950,' and the second cycle had an aggregate award value of '940,' thereby resulting a cumulative award value of '3890' as presented by the meter 216. In some embodiments, a different meter 216 may be presented for each cycle. For example, the meter 216 for each cycle may be presented as indicia within a corresponding trigger symbol 206, or the aggregated award meter 216 may be presented in at least the previous trigger symbol 206 (e.g., the meter presented in the trigger symbol 212 in the fourth state and then at least the trigger symbol 214 in the fifth state). In other embodiments, rather than a dedicated award meter 216, the award values are accumulated within the credit balance meter or meters of the player. In such embodiments, the interface 200 and/or other related interfaces presented by the presentation assembly may be updated to include a notification or banner indicating the accumulated award value for each cycle and/or the award sequence.

In the example embodiment, in the fifth state, the award indicia has been removed from the award symbols 208. The removal of the award indicia is used to indicate that the award values have been accumulated and incorporated into the award meter 216. One or more animations may be used to indicate the accumulation of the award values from the award symbols 208. In the fifth state, there is no subsequent cycle, so the award indicia is removed without replacement. In other embodiments, the award indicia may remain at the end of the cycle and the award sequence.

FIG. 4F depicts a sixth state following the third state as an alternative to the fourth and fifth states shown in FIGS. 4D and 4E. In the sixth state, the second cycle has concluded with the same award values selected as the fourth state (i.e., the values shown in FIG. 4D for the second cycle were also selected in FIG. 4F). However, unlike the fourth and fifth states, the award symbols 208 are used to store the award values accumulated from prior cycles. That is, the award indicia, rather than being replaced between cycles, is updated to reflect the award values selected for the award symbol 208 for the prior cycles and the current cycle. That is, the values shown in the award symbols 208 in FIG. 4F are the aggregated award values from the first and second cycles for each award symbol 208 (i.e., in the illustrated embodiments, the values are the combination of values from FIG. 4C and FIG. 4D). In such an embodiment, these accumulated award values may be awarded at the conclusion of the cycles and the award sequence.

In certain embodiments, only a portion of the award values accumulated over the cycles and/or the different award symbols 208 may be awarded. In such embodiments, the awarded cycles and/or award symbols 208 may be determined at least partially based on one or more random outcomes, one or more game events or conditions, and/or predefined rules associated with the game feature.

Figure 4G:
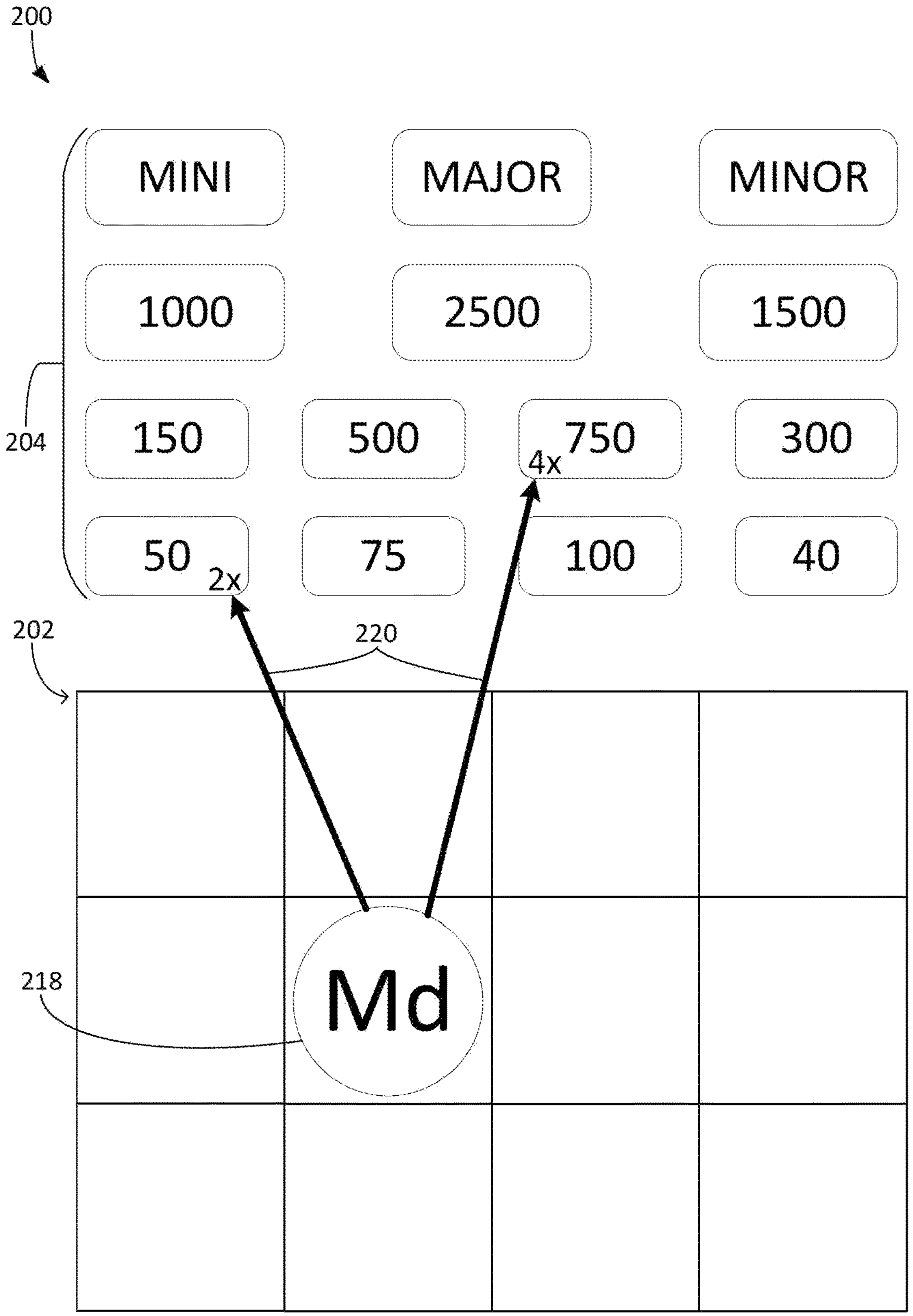
FIG. 4G is the game interface shown in FIG. 4A in a seventh state, according to an embodiment of the present invention.

In some embodiments, additional symbols may be used to enhance or otherwise change the award sequence and/or the corresponding game elements. FIG. 4G depicts the game interface 200 in a seventh state. In the seventh state, a modifier symbol 218 occupies the symbol array 202. In the example embodiment, the modifier symbol 218 is associated with a corresponding multiplier that is applied to one or more award options 204 as indicated by arrows 220 and the multiplier indicia added to the corresponding options 204. The value of the multiplier and which award options are linked to the multiplier may be at least partially random, based on one of more game events or conditions (e.g., the presence or absence of other multipliers), and/or based on predetermined rules of the game feature. Multiple multipliers may be applied to one award option 204, or only one multiplier may be applied to each option 204.

The multiplier is configured to persist with the award options 204 for a predefined period of time or until a predefined event is detected, such as an award sequence activating and concluding. If one of the award options associated with the multiplier is selected within the award sequence, the multiplier is applied to the award value before updating the award symbol 208. In certain embodiments, the award indicia of the award option 204 is updated to include the multiplier prior to selection. In some embodiments, the multiplier may be applied in a different manner. For example, the multiplier may be applied to one or more additional award symbols 208 in response to the award option 204 being selected.

The multiplier-based modifier symbol 218 may be one form of modifier applied to the game feature. That is, in addition to or alternative to the multipliers, the modifier symbols 218 may include other types of modifiers, such as (and without limitation) credit additions, award replacements, adding or removing award options 204, trigger symbols 206, and/or award symbols 208, enhancing the probability of receiving certain symbols or the award sequence, free spins, bonus game feature, changing the array size, and the like. These modifiers may be triggered in response to one modifier symbol 218 occupying the array 202 or another suitable trigger event, such as the presence of multiple modifier symbols 218 of the same type within the array 202. The modifiers, even those that do not directly impact the award values, may be applied to the award options 204 such that selecting the associated award option 204 triggers the modifier to be applied. The different types of modifiers may persist for a different duration based on predefined rules associated with each modifier (including no persistence).

Figure 4H:
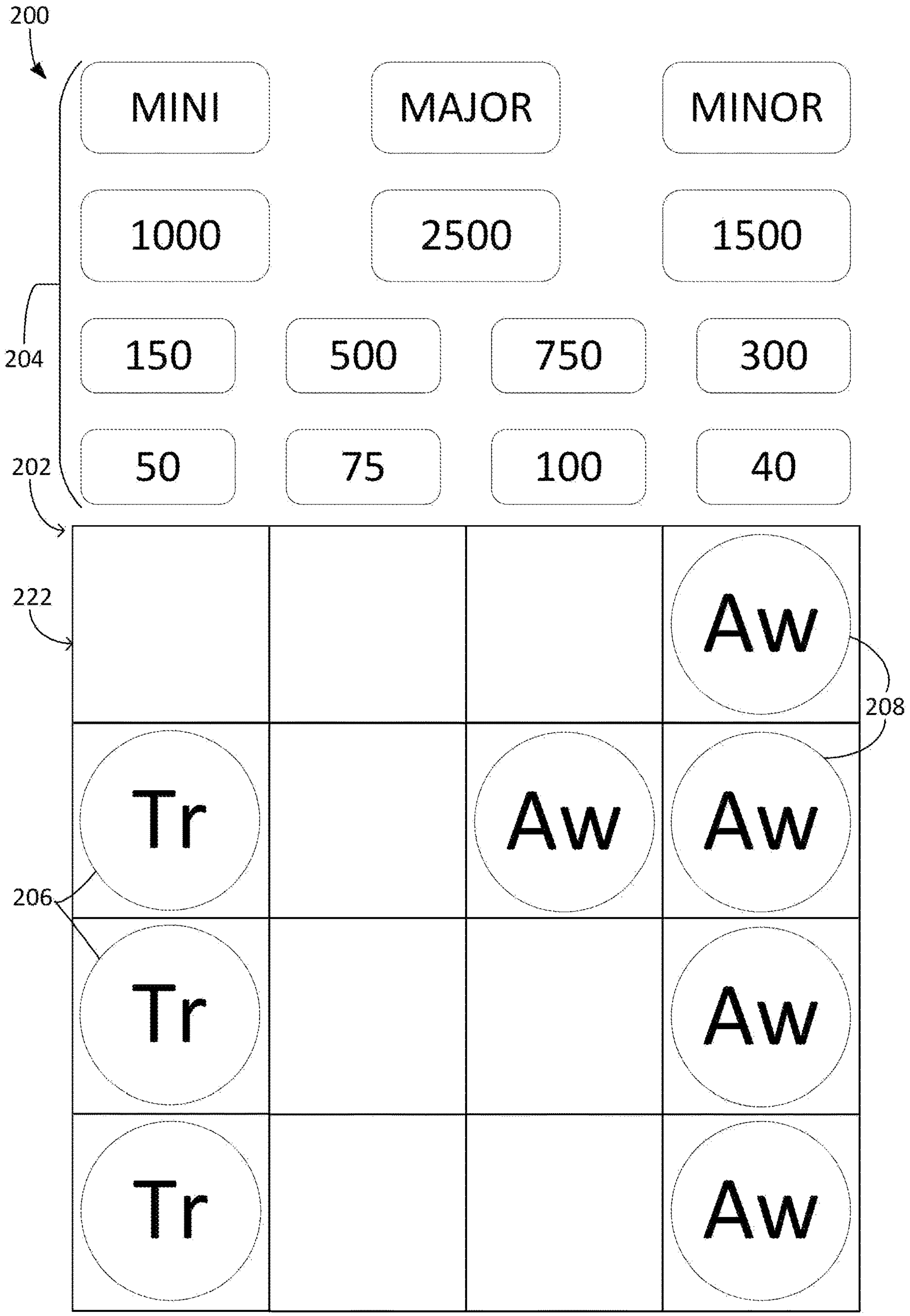
FIG. 4H is the game interface shown in FIG. 4A in an eighth state, according to an embodiment of the present invention.

In at least some embodiments, the game feature associated with FIGS. 4A-4G may include a bonus game feature that includes similar functions as the base game feature. The bonus game feature is initiated in response to a bonus game trigger being detected (e.g., modifier symbols 218 associated with bonus game feature being detected). FIG. 4H depicts the interface 200 in an eighth state. In the eighth state, a bonus game feature is initiated. The bonus game feature in the illustrated embodiment is substantially similar to the base game feature but includes additional symbol positions in the array 202. More specifically, the array 202 includes a new row 222 of symbol positions. By increasing the number of symbol positions (particularly the symbol positions in which the trigger symbols 206 and/or the award symbols 208 appear), the likelihood of triggering an award sequence and/or increasing the duration and/or number of awards in the award sequence increases.

Other suitable changes to the game feature may be applied to the bonus game feature in addition to or in place of the additional row 222 of symbol positions. In one example, the probabilities of selecting triggers symbols 206 and/or the award symbols 208 are enhanced. In another example, trigger symbols 206 and/or award symbols 208 (or special symbols that are converted to trigger and/or award symbols) may be held within the array 202 until an award sequence is initiated. In a further example, the award options 204 may be enhanced to increase the award values of at least some award options 204 and/or one or more lower value award options 204 are removed to increase the chance of selecting higher value award options 204. In yet another example, additional trigger symbols 206 and/or award symbols 208 are added to the array 202 in response to triggering an award sequence. In a further example, modifiers are applied to one or more of the award options 204. Other suitable enhancements may be used, including those described elsewhere herein.

Figure 5:
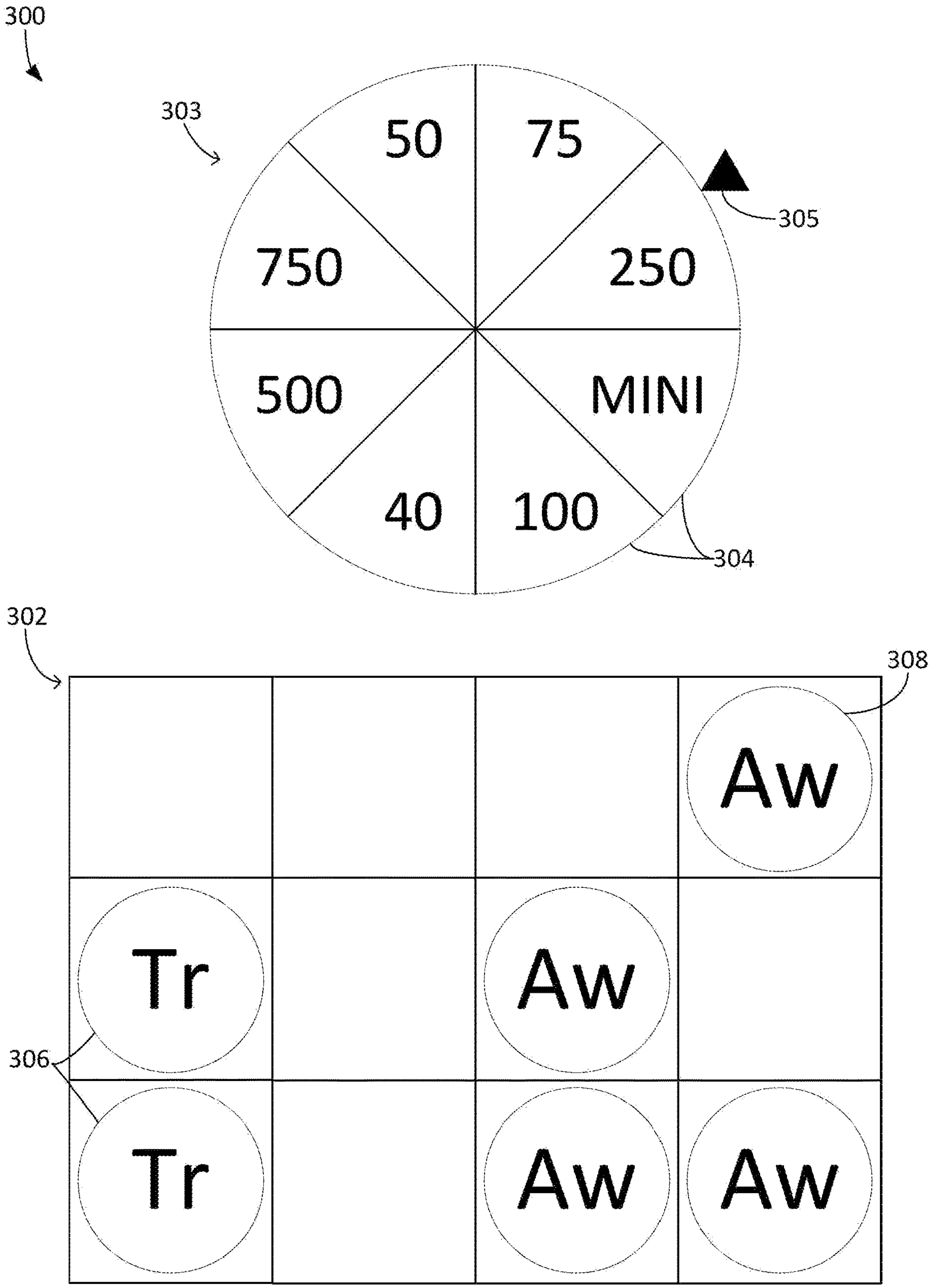
FIG. 5 is a gaming interface of a gaining system for a game feature using an award wheel, according to an embodiment of the present invention.

In some embodiments, other suitable configurations of the game interface may be used to provide the functionality of the gaming system as described herein. FIG. 5 depicts an example game interface 300 for use by the gaming system according to one or more embodiments of the present disclosure. The game interface 300, like the game interface 200 shown in FIGS. 4A-4H, includes a symbol array 302, award options 304, trigger symbols 306, and award symbols 308 such that the functionality associated with the award sequence is the same within the symbol array 302. However, unlike a prize board, the award options 304 are presented as wheel segments or wedges of an award wheel 303. The selection of an award option 304 is presented through the wheel 303 and/or a selector element 305 being animated to spin and stop. When the wheel 303 and/or the selector 305 stop, the selector 305 indicates the selected award option 304. This process may be repeated for each award symbol 308 in a given cycle. III other embodiments, multiple award wheels 303 may be presented, including embodiments with one wheel 303 per award symbol 308. In one example, the award symbols 308 are animated to mirror the layout of the wheel 303 and spin to select the corresponding award option 304. In another example, a plurality of wheels 303 are presented, and the selection of awards for the award symbols 308 is a two-stage process: (i) selecting awards from the wheels 303, and (ii) selecting which award to apply to one or more award symbols 308. Other suitable configurations of presenting and conducting the award sequence, including configurations with alternative award wheels 303 and corresponding award sequences, may be used.

In the embodiments disclosed herein, each award option may be assigned a credit value that is displayed upon the option. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing award option as part of the reel strip layouts of the game reels. In still other embodiments, the assigned value may be randomly selected before, during, or at the conclusion of a reel spin and/or award sequence.

As disclosed in the embodiments herein, awards may be provided for each game outcome based on at least the remaining symbols. For example, line pays and scatter pays may be awarded for each game cycle outcome based on the symbols populating the symbol array. In some embodiments, the trigger and/or award symbols may not be associated with awards outside of the features described herein. In other embodiments, the trigger and/or award symbols may be included within line pays, scatter pays, and/or other suitable awards.

While the embodiments are largely described within the context of a base game, it is equally contemplated that the disclosed embodiments can be practiced within the context of a free game bonus without a wager between free game cycles.

The embodiments of the present invention provide an innovative procedure for selecting values of symbols in a symbol array in a unique multi-cycle award sequence. Game-logic circuitry executing instructions in accordance with the embodiments present a visual display of award options and spinning reels with clearly enumerated symbology that combine in readily understood arrangements to trigger multi-cycle award sequences and selecting one or more awards per cycle based on the symbols. An observer experiences excitement and anticipation as new symbols land in the array, award sequences are triggered, values are selected from the award options for each award symbol per cycle, and one or more awards are provided from each award sequence. In stark contrast to conventional reel-spinning games in which symbol images are evaluated for winning combinations by paytable rules, the disclosed embodiments provides immediately recognizable values in WYSIWYG display configurations while adding variability as to how the values to be awarded to the player are selected from the award options and how many awards are selected.

The multi-cycle award sequence may be symbol- and game-agnostic. Themes and imagery of symbols and environment may be varied with no effect on the value-award process. Or, if so desired, the criteria for value-award may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated—all this adds to processing overhead. Special symbols like wilds, multipliers, and scatter symbols can modify paytable values and may require separate, additional evaluation according to customized rule sets. All these procedures can be inherently more complex than simple collection of number values and a random selection from the collected values. The embodiments disclosed herein represents a win-win: simpler, almost self-explanatory graphics combined with faster, more efficient processing. The inventive value-award procedure can be implemented on the vast majority of casino gaming machines without requiring upgrades or modifications.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that, the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:

a presentation assembly configured to present a graphical game interface including a plurality of award options and a plurality of symbol positions, each award option of the plurality of award options including award indicia visibly indicating an award value associated with the award option; and game-logic circuitry in communication with the presentation assembly, the game-logic circuitry configured to:

cause the presentation assembly to present, via the graphical game interface, a game outcome by animating population of the plurality of symbol positions with a plurality of symbols according to one or more outputs of a continuously cycling random number generator of the game-logic circuitry; and in response to the plurality of symbols including at least one trigger symbol and at least one award symbol, cause the presentation assembly to present, via the graphical game interface, an award sequence comprising an animation cycle for each of the at least one trigger symbol, each animation cycle of the award sequence including:

cause the presentation assembly to visually select a respective one or more award options of the plurality of award options for each of the at least one award symbol, the respective visual selection indicated by animating at least one of the one or more award options or the award symbol;

cause the presentation assembly to visually update award indicia for each of the at least one award symbol based on the award value associated with the respective selected one or more award options;

cause the presentation assembly to animate an aggregation of award values indicated by the updated award indicia of the at least one award symbol; and in response to determining the award sequence includes one or more remaining cycles, cause the presentation assembly to visually remove the updated award indicia from the at least one award symbol.

2. The gaming machine of claim 1, wherein the game-logic circuitry is configured to, in response to the plurality of symbols including a modifier symbol, cause the presentation assembly to visually apply a modifier associated with the modifier symbol to one or more award options of the plurality of award options, the modifier updating the award values associated with the one of more award options.

3. The gaming machine of claim 2, wherein the modifier is applied to the one or more award options for one or more game outcomes, and wherein the modifier is visually removed from the one or more award options in response to an award sequence associated with trigger symbols and award symbols.

4. The gaming machine of claim 2, wherein applying a plurality of modifiers to a first award option of the plurality of award options updates the award value associated with the first award option at least partially as a function of the plurality of modifiers.

5. The gaming machine of claim 1, wherein the plurality of symbol positions is organized into a symbol array having rows and columns, and wherein any of the at least one trigger symbol selectively populates a first column or a first row of the symbol array.

6. The gaming machine of claim 1, wherein the game-logic circuitry is configured to, in response to concluding a first cycle of the award sequence associated with a first trigger symbol of the at least one trigger symbol, cause the presentation assembly to change a visual appearance of the first trigger symbol.

7. The gaming machine of claim 1, wherein the at least one award symbol includes a plurality of award symbols and wherein, for each cycle of the award sequence, each of the award options is selectable for one or more award symbols of the plurality of award symbols.

8. A method for conducting and presenting a multi-cycle game feature using a gaming system, the gaming system comprising a presentation assembly of a gaming machine and game-logic circuitry in communication with the presentation assembly, the method comprising:

presenting, by the presentation assembly, a graphical game interface including a plurality of award options and a plurality of symbol positions, each award option of the plurality of award options including award indicia visibly indicating an award value associated with the award option;

causing, by the game-logic circuitry, to present, via the graphical game interface, a game outcome by animating population of the plurality of symbol positions with a plurality of symbols according to one or more outputs of a continuously cycling random number generator of the game-logic circuitry; and in response to the plurality of symbols including at least one trigger symbol and at least one award symbol, causing, by the game-logic circuitry, the presentation assembly to present, via the graphical game interface, an award sequence comprising an animation cycle for each of the at least one trigger symbol, each animation cycle of the award sequence including:

causing, by the game-logic circuitry, the presentation assembly to visually select a respective one or more award options of the plurality of award options for each of the at least one award symbol, the respective visual selection indicated by animating at least one of the one or more award options or the award symbol;

causing, by the game-logic circuitry, the presentation assembly to visually update award indicia for each of the at least one award symbol based on the award value associated with the respective selected one or more award options;

causing, by the game-logic circuitry, the presentation assembly to animate an aggregation of award values indicated by the updated award indicia of the at least one award symbol; and in response to determining the award sequence includes one or more remaining cycles, causing, by the game-logic circuitry, the presentation assembly to visually remove the updated award indicia from the at least one award symbol.

9. The method of claim 8 further comprising, in response to the plurality of symbols including a modifier symbol, causing, by the game-logic circuitry, the presentation assembly to visually apply a modifier associated with the modifier symbol to one or more award options of the plurality of award options, the modifier updating the award values associated with the one of more award options.

10. The method of claim 9, wherein the modifier is applied to the one or more award options for one or more game outcomes, and wherein the modifier is visually removed from the one or more award options in response to an award sequence associated with trigger symbols and award symbols.

11. The method of claim 9, wherein applying a plurality of modifiers to a first award option of the plurality of award options updates the award value associated with the first award option at least partially as a function of the plurality of modifiers.

12. The method of claim 8, wherein the plurality of symbol positions is organized into a symbol array having rows and columns, and wherein any of the at least one trigger symbol selectively populates a first column or a first row of the symbol array.

13. The method of claim 8, wherein the at least one award symbol includes a plurality of award symbols and wherein, for each cycle of the award sequence, each of the award options is selectable for one or more award symbols of the plurality of award symbols.

14. The method of claim 8, wherein removing the updated award indicia is in response to selecting award options of the plurality of award options for a subsequent cycle of the award sequence.

15. A gaming system comprising:

a gaming machine comprising a presentation assembly configured to present a graphical game interface including a plurality of award options and a plurality of symbol positions, each award option of the plurality of award options including award indicia visibly indicating an award value associated with the award option; and game-logic circuitry in communication with the presentation assembly, the game-logic circuitry configured to:

cause the presentation assembly to present, via the graphical game interface, a game outcome by animating population of the plurality of symbol positions with a plurality of symbols according to one or more outputs of a continuously cycling random number generator of the game-logic circuitry;

in response to the plurality of symbols including at least one trigger symbol and at least one award symbol, cause the presentation assembly to present, via the graphical game interface, an award sequence comprising an animation cycle for each of the at least one trigger symbol, each animation cycle of the award sequence including:

cause the presentation assembly to visually select a respective one or more award options of the plurality of award options for each of the at least one award symbol;

cause the presentation assembly to visually update award indicia for each of the at least one award symbol based on the award value associated with the respective selected one or more award options; and cause the presentation assembly to animate an accumulation sequence to store award values indicated by the updated award indicia of the at least one award symbol for the cycle; and in response to determining the animation cycles of the award sequence have completed, cause the presentation assembly to present an aggregation animation for the stored award values from each of the animation cycles of the award sequence.

16. The gaming system of claim 15, wherein the game-logic circuitry is configured to, in response to the plurality of symbols including a modifier symbol, cause the presentation assembly to visually apply a modifier associated with the modifier symbol to one or more award options of the plurality of award options, the modifier updating the award values associated with the one of more award options.

17. The gaming system of claim 16, wherein the modifier is applied to the one or more award options for one or more game outcomes, and wherein the modifier is visually removed from the one or more award options in response to an award sequence associated with trigger symbols and award symbols.

18. The gaming system of claim 16, wherein applying a plurality of modifiers to a first award option of the plurality of award options updates the award value associated with the first award option at least partially as a function of the plurality of modifiers.

19. The gaming system of claim 15, wherein the plurality of symbol positions is organized into a symbol array having rows and columns, and wherein any of the at least one trigger symbol selectively populates a first column or a first row of the symbol array.

20. The gaming system of claim 15, wherein the at least one award symbol includes a plurality of award symbols and wherein, for each cycle of the award sequence, each of the award options is selectable for only one award symbols of the plurality of award symbols.

21. The gaming system of claim 15, wherein the updated award indicia is at least partially a function of the award value associated with the respective selected one or more award options and the stored award values associated with the award symbol from any prior cycles of the award sequence.

22. The gaming machine of claim 3, wherein the modifier is removed from the one or more award options in response to a base game outcome including an award sequence associated with trigger symbols and award symbols.

23. The method of claim 10, wherein the modifier is removed from the one or more award options in response to a base game outcome including an award sequence associated with trigger symbols and award symbols.

24. The gaming system of claim 17, wherein the modifier is removed from the one or more award options in response to a base game outcome including an award sequence associated with trigger symbols and award symbols.

* * * * *